(12) United States Patent
Canali et al.

(10) Patent No.: US 7,272,579 B1
(45) Date of Patent: Sep. 18, 2007

(54) AUCTION BASED PROCUREMENT SYSTEM

(75) Inventors: Luigi J. F. Canali, Darnestown, MD (US); Stephen P. Candelmo, Bethesda, MD (US); Felipe J. Fuster, Darnestown, MD (US); Frank D. Banda, Brookeville, MD (US); Brendan B. Walsh, Leesburg, VA (US); Gail M. Bergantino, Germantown, MD (US); Jorn M. Schaffner, Fairfax, VA (US); Michael J. Hasslinger, Reston, VA (US)

(73) Assignee: FedBid, Inc., Vienna, VA (US)

( * ) Notice: Subject to any disclaimer, the term of this patent is extended or adjusted under 35 U.S.C. 154(b) by 1149 days.

(21) Appl. No.: 09/784,330

(22) Filed: Feb. 16, 2001
(Under 37 CFR 1.47)

Related U.S. Application Data

(60) Provisional application No. 60/183,154, filed on Feb. 17, 2000.

(51) Int. Cl.
*G06Q 40/00* (2006.01)
(52) U.S. Cl. .......................................... 705/37; 705/26
(58) Field of Classification Search ............. 705/10–42
See application file for complete search history.

(56) References Cited

U.S. PATENT DOCUMENTS

| | | | | |
|---|---|---|---|---|
| 6,012,045 A | * | 1/2000 | Barzilai et al. | 705/37 |
| 6,260,024 B1 | * | 7/2001 | Shkedy | 705/37 |
| 6,397,197 B1 | * | 5/2002 | Gindlesperger | 705/37 |
| 6,415,270 B1 | * | 7/2002 | Rackson et al. | 705/36 R |

FOREIGN PATENT DOCUMENTS

EP    A 040 026    * 9/1991

OTHER PUBLICATIONS

Computerworld, Framingham: Jun. 27, 1994, Washington Telecom News, v2 n26, pN/A (Dialog File 16, Accession No. 03435210).*

* cited by examiner

*Primary Examiner*—Frantzy Poinvil
(74) *Attorney, Agent, or Firm*—Arent Fox LLP; Wilburn L. Chesser; Juliana I. Haydoutova

(57) ABSTRACT

A method for generating a request for an item. The method determines the request for the item based on at least one of (i) an item to purchase, (ii) a performance specification of the item to purchase, and (iii) a term of a request for the item to purchase. The method then sends, through a network, the request for the item to an auctioneer machine server.

54 Claims, 30 Drawing Sheets

Sample Case Studies

Case 1

| | |
|---|---|
| 8/30, 11:15 am | Department of Transportation cardholder submits request for 15 printers Target price: $661 per unit, per GSA |
| 9/1, 5:00 pm | Auction closes: 47 vendors have bid. Result: unit price down to $635, delivered. |
| Stats: | 1 request, 30 hours, 47 bids, 4% savings over GSA price |
| Total Savings | $390 |

Case 2

| | |
|---|---|
| 8/31, 2:23 pm | An Air Force cardholder submits a request for tape cartridges |
| 9/1, 5:00 pm | Auction closes: 19 vendors have bid. Result: price per tape down to 37% below Target Price. |
| Stats: | 1 request, 26 hours, 19 bids, 37% savings |
| Total Savings | 37% |

Case 3

| | |
|---|---|
| 9/1, 10:00 am | An auction request from a Department of Transportation cardholder initiates a competition between two major PC manufacturers for 23 high-end desktop PCs. Target Price $2030 per unit. |
| 9/5, 10:00 am | Leading bid $1684 per unit. |
| 9/5, 12:00 pm | Auction closes: 2 top vendors have engaged in a spirited bidding war. Result: leading bid price down to $1444 per unit, delivered—28% below Target Price |
| Stats: | 1 request, 48 business hours, 28% savings |
| Total Savings | $13,478 |

Case 4

| | |
|---|---|
| Day 1 | A State Department cardholder requests a FedBid.com auction for a Lexmark printer. A non-FedBid.com vendor has quoted a manufacturer-sponsored trade-in discount of $2165 that would require the cardholder to turn in the printer it's now using. |
| 24 hrs later | Auction result: price down to $2117, delivered, with no trade-in |
| Stats: | 1 request, 24 hours, 13 bids, winning price beats trade-in price |
| Total Savings | value of retained printer plus $48 |

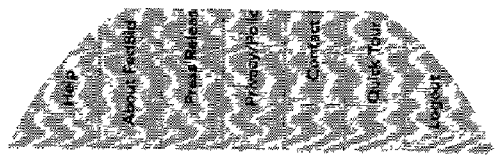

My Credit Card Log

Credit Card No. 20511 (Last 5 Digits)

01/01/2000 - 01/01/2001

| | Date Ordered | FedBid Item No. | Description | Vendor (Company, Sales Rep., Phone) | Vendor Type | Unit Price | Quantity | Total Price | Date Billed | Amount Billed | Date Paid | Statement Ref. No. | Dispute |
|---|---|---|---|---|---|---|---|---|---|---|---|---|---|
| Modify | 10/26/2000 | 201 | Digital Camera, Carrying Case, and (3) Smart Cards | GOVPLACE, Sean Burke, 8883088802 | 8(A) Firm, Minority-owned, Small Business, Veteran-owned, Women-owned | $1,010.94 | 1 | $1,010.94 | 10/26/2000 | $1,010.94 | 10/31/2000 | | |
| Modify | 11/07/2000 | 226 | SYSTEM SHOCK PROOF HARD CASE FOR G30303 DIGITAL CAMERA | DESKTOPS BY DESIGN, Lenar Prater, 8017752909 3019222854 | | $43.34 | 1 | $43.34 | 11/07/2000 | $43.34 | | | |
| Modify | 11/13/2000 | 227 | AA NIMH BATTERY PACK WITH CHARGER | USA SUPPLY, Patrick Boylan, 9728892867 | 8(A) Firm, Minority-owned, Small Business, Veteran-owned, Women-owned | $53.62 | 1 | $53.62 | 11/13/2000 | $53.62 | | | |

FedBid.com

My Home | View Orders

Bids for Item No. 249

Description: Metal Joiner Doors
Participating vendors (in alphabetical order) include
PACIFIC MARITIME INDUSTRIES, PIER SIDE SUPPLY, INC., SPEC-BUILT SYSTEMS, YORK MANUFACTURING, INC.

| Vendor | Price/Unit ** |
|---|---|
| Vendor 1 | $972.06 |
| Vendor 2 | $998.32 |
| Vendor 3 | $1,014.08 |
| Vendor 4 | $1,208.42 |

*Source: D&B
**Includes domestic shipping & handling

Back

As of 12/12/2000 16:23 (ET)

© 2000 Procurement Technologies, Inc. All rights reserved

Bid Results for Pool 245

Metal Joiner Doors

Your Bid Status: Lost

For your convenience, the details of the winning bid are listed below. Please check Request for Bids for additional opportunities. Thank you for using FedBid.com

| | | | |
|---|---|---|---|
| Category | Computers | Quantity | 15 |
| Subcategory | Metal Doors | End Date | 12/05/2000 |
| Evaluation Criteria | Exact Match | End Time | 18:00 ET |

Customer Specs

| | | Winning Bid | |
|---|---|---|---|
| Manufacturer | Various | Manufacturer | Various |
| Mnfr. ID No: | 804-1848655 LH | Mnfr. ID No: | 1648655p |
| | | Warranty: | 12 |
| Vendor Type | All Vendors | Max Qty | 50 |

| | |
|---|---|
| Product Cost/Unit | $925.00 |
| FedBid Fee/Unit | $27.75 |
| Credit Card Fee/Unit | $19.31 |
| Winning FedBid/Unit | $972.06 |

Auto ReBid Option

| Award Criteria: Best Price | % |
|---|---|
| Price | 100 |
| Features | 0 |
| Risk Rating* | 0 |
| Warranty (Months) | 0 |

*Source: D&B

| Feature | Criteria | Bid Spec |
|---|---|---|
| Document # | N62793-0292-K006 | N62793-0292-K006 | Meet |
| Parts | 804-1848655 LH | 804-1848655 LH | Meet |
| door knobs | no keyed door knobs | no keyed door knobs | Meet |
| hold back hook and bumper | with IAW DWG 804-5059320 | with IAW DWG 804-5059320 | Meet |
| kick plates | with kick plates | with kick plates | Meet |

Bid Results for Pool 218

Your Bid Status: Won
No. of Units Accepted: 0

Metal joiner door

Congratulations! You have the winning bid for Pool 218. You will receive a separate P.O. by email for each order within the pool, upon acceptance of the bid by the customer(s). The P.O. will include details such as quantity and delivery information. In addition, you may view shipping addresses, as they become available, by clicking on the 'shipping' button at the bottom of this page

| | | | |
|---|---|---|---|
| Category | Computers | Quantity | 3 |
| Subcategory | Metal Doors | End Date | 11/13/2000 |
| Evaluation Criteria | Exact Match | End Time | 18:00 ET |

Customer Specs

| | | Winning Bid | |
|---|---|---|---|
| Manufacturer: | various | Manufacturer: | various |
| Mnfr. ID No | 804-164434RH | Mnfr ID No. | yml5959320-orh |
| | | Warranty | 3 |
| Vendor Type | All Vendors | Max Qty : | 100 |

Product Cost/Unit      $675.00
FedBid Fee/Unit         $20.25
Credit Card Fee/Unit    $14.19

Winning FedBid/Unit:   $709.44

Award Criteria / Best Price

| | Criteria | |
|---|---|---|
| Price | 100 | |
| Features | 0 | Document Amount |
| Risk Rating* | 0 | Stop Auto Rebid at |
| Warranty (Months) | 0 | |
| *Source D&B | | |

Bid Spec

| Feature | Criteria | Meet |
|---|---|---|
| 28 x 75 | Not Specified | Not Specified |
| Pin Type: C 604 1642438RH | Not Specified | Not Specified |

AUCTION BASED PROCUREMENT SYSTEM

This application claims the benefit of U.S. Provisional Application No. 60/183,154, filed Feb. 17, 2000.

BACKGROUND

1. Field of the Invention

The present invention relates to network communications. More specifically, the present invention relates to an auction based procurement system.

2. Description of Background Information

Traditionally in the business world matching buyers and sellers is achieved through advertisement or word of mouth. This is usually followed by contacts between the buyers and sellers which sometimes includes lengthy negotiations and massive paper work. Volume trading procures discounts which are usually achieved in auctions by corporations or government entities ordering large volumes of products or services.

Added time and expenses are wasted on collecting, mining, processing, and modeling prior information from a huge selection of catalogs, trade publications, and directories. Normally this data is used to generate standard business reports and produce quantitative analyses on market trends. The above information is then correlated and analyzed to maximize savings through volume trading.

There are several types of auctions including sealed-bid auctions, ascending bid auctions, e-mail auction, seller-driven systems, and buyer-driven systems. Sealed-bid auctions are where the bidders in one single bidding round simultaneously and independently submit sealed bids to the auctioneer who then determines the auction outcome. Ascending-bid auctions are where the bidders are in a dynamic bidding process submitting bids in real-time until no more bids are forthcoming.

In e-mail auctions, an auction catalog is electronically mailed to people interested in bidding. Subsequently, bidders submit their bids on individual lots to an auctioneer via e-mail. A disadvantage to e-mail auctions are that a human auctioneer is required and it is very difficult for the auctioneer to keep the bidders updated as to the current high bids on the various items.

A system is seller-driven in the sense that they focus on the methods and processes available to the seller, allowing him to price, package, or configure goods and services more effectively. The vast majority of retail purchases utilize seller-driven, fixed-price, non-negotiable pricing protocols. The buyer does not find the seller, rather the seller attracts numerous buyers who, as a group, determine the final selling price.

A buyer driven system is where a buyer can exercise more control over the terms and conditions of the purchase. If each buyer has a different set of purchasing specifications, communicated using non-uniform language, sellers pay a high cost to review and understand each individual request.

The following patents describe different types of auction based systems and business methods for trading various consumer products and services. U.S. Pat. No. 5,664,115 ("the '115 patent"), issued to Richard Fraser on Sep. 2, 1997, presents an interactive computer system which matches buyers and sellers of real estate, business and other property using the Internet.

The '115 patent provides for the buyer's information to be evaluated by the host system and determine whether the buyer is qualified to purchase each selected property. This computer system obtains and stores a set of records, each corresponding to a property to be sold. Each set of records can then be searched by a remote data terminal associated with a potential buyer.

The results of this search are then provided to the potential buyer, who indicates specific property listings that the potential buyer may be interested in purchasing. The potential buyer provides identifying information which is then provided to the sellers of the indicated property. This interactive computer system does not offer a method or system for volume discount pricing. The '115 patent mainly deals with real estate and other property which is not volume trading sensitive.

U.S. Pat. No. 5,715,402, issued to Carl A. Popolo on Feb. 3, 1998, specifies a method and system for matching sellers and buyers dealing in spot metals. This is a system for managing steel inventories that aids in selling primary and secondary steel. Sellers can post detailed descriptions of an item for sale and buyers can browse or search the posted inventory. A buyer may bid on part or all of an item posted and the seller may accept or reject any bid. The bidding is done through an auction by electronic mail.

U.S. Pat. No. 5,717,989, issued to Tozzoli et al. on Feb. 10, 1998, stipulates a full service trade system for storing criteria specified by a funder relating to a trade transaction for buyers and sellers. The trade system compares the criteria with a proposed purchase order to determine whether the system can generate a payment guarantee on behalf of the funder for the buyer to the seller.

When the appropriate conditions for payment are met, the system issues funds transfer instructions to transfer payment from the buyer to the seller. This system is not auction based, instead the main purpose of this patent is to confirm that payment is made by the buyer to the seller.

U.S. Pat. No. 5,758,328, issued on May 26, 1998, and U.S. Pat. No. 5,842,178 ("the '178 patent"), issued on Nov. 24, 1998, to Joseph Giovannoli describe a computerized quotation system and method. These systems are for forming a computer based communications network of network members consisting of network buyers and sellers for processing requests for quotation for goods and services through at least one central processing unit. The system includes a filtering means for controlling the communication linkage between network members.

The '178 patent contains no central database of goods and prices, instead the buyer formulates requests and the seller analyzes each request. The system is also not auction based and does not involve volume discount type trading.

U.S. Pat. No. 5,781,911, issued to Young et al. on Jul. 14, 1998, discloses an integrated system and method for data warehousing and delivery. This system consists of an integrated automatic generation of data warehouses or data marts further integrated with an automatic delivery of information from the data warehouses to knowledge workers throughout the enterprise.

This integration allows information in the data warehouses to be delivered immediately after every refresh of the data warehouse. This is to permit maximum utilization of the information in the data warehouses throughout the enterprise to gain the most optimum decision support. This system deals with the method for extracting data from production of on-line transaction systems and processing that data into information and distributing the information.

U.S. Pat. No. 5,794,207, issued to Walker et al. on Aug. 11, 1998, characterizes a method and apparatus for a cryptographically assisted commercial network system designed to facilitate buyer-driven conditional purchase offers. A controller receives binding purchase offers from prospective buyers. The controller makes purchase offers available globally to potential sellers. Potential sellers then have the option to accept a purchase offer and bind the corresponding buyer to a contract.

Under this method, the buyer is bound and does not have a chance to accept or reject seller's response to the buyer's offer. This is not a volume based discount trading system, instead it is a one-buyer, one-seller system. This system does not utilize a master catalog or use historical data for creating bids.

U.S. Pat. No. 5,794,219, issued to Stephen J. Brown on Aug. 11, 1998, discloses a method of conducting an on-line auction that permits individual bidders to pool bids during a bidding session. The auction is conducted over a computer network that includes a central computer, a number of remote computers, and communication lines connecting the remote computers to the central computers.

A number of bidding groups are registered in the central computer and each bidding group has a total bid for the item being auctioned. Bids are entered from the remote computers which are received in the central computer, each bid including a bid amount and a bid designation. Each bid amount is contributed to the total bid of the bidding group indicated by the bid designation.

The bidding group that has the largest total bid at the end of the bidding session wins the item being auctioned. The method then declares a winning group, the winning group being the one bidding group having the largest total bid at the end of the bidding session.

U.S. Pat. No. 5,835,896, issued to Fisher et al. on Nov. 10, 1998, explains a system and method for conducting a multi-person, interactive auction, in a variety of formats without using a human auctioneer to conduct the auction. The system allows a group of bidders to interactively place bids over a computer or communications network. Those bids are recorded by the system and the bidders are updated with current auction status information.

When appropriate, the system closes the auction from further bidding and notifies the winning bidders and losers as to the auction outcome. This patent promotes higher prices for the seller and does not give the buyer the chance to withdraw bid.

U.S. Pat. No. 5,890,138, issued to Godin et al. on Mar. 30, 1999, discloses an auction system which allows users to participate using their own computers suitably connected to the auction system.

The patent involves a method and system for providing rapid feedback of a reverse auction process and removes the user from the process once an indication to purchase has been received. Rapid feedback in combination with security of information is achieved with the method and auction system.

This method includes removing each purchaser from the auction process upon providing instructions to purchase the product at the displayed current price at the time the instructions were received. In this way the purchaser is not exposed to further decreases in the price of the product, and is removed from that particular auction process.

U.S. Pat. No. 5,905,975, issued to Lawrence M. Ausubel on May 18, 1999, specifies a computer implemented system and method of executing an auction. The system has at least two intelligent systems, one for the auctioneer and at least one for a user. The auction is conducted by the auctioneer's system communications with the user systems.

The auctioneer's system contains information from the user, system based on bid information entered by the user. With this information the auctioneer's system determines whether the auction can be concluded or not and appropriate messages are transmitted to the users.

At any point in the auction, bidders are provided the opportunity to submit their current bids, as well as future bids, into the auction system's database. Participants are continually provided the opportunity to revise their bids associated with all future times or prices which have not already been reached, by entering new bids which have the effect of superseding the bidder's bid currently residing in the auction system's database.

U.S. Pat. No. 5,924,082 ("the '082 patent"), and U.S. Pat. No. 5,924,083 ("the '083 patent"), both issued to Silverman et al. on Jul. 13, 1999, both describe a form of matching system. The '082 patent is a negotiated matching system which includes a plurality of remote terminals associated with respective potential counter-parties, a communication between the remote terminals, and a matching station. Each user enters trading information and ranking information into his or her remote terminal.

The matching station then uses the trading and ranking information from each user to identify transactions between counter-parties that are mutually acceptable based on ranking information, thereby matching potential counter-parties to a transaction. Once a match occurs, the potential counter-parties transmit negotiating messages to negotiate some or all terms of the transaction. Thus, the negotiated matching system first matches potential counter-parties who are acceptable to each other based on trading and ranking information, and then enables the two counter-parties to negotiate and finalize the terms of a transaction.

The '083 patent by Silverman, et al. details a distributed matching system which generates and provides to trading entities a market view display, including a predetermined number of bids and offers of multiple trading instruments. These are available to each individual trading entity based on unilateral and/or bilateral credit availability between the offeror/bidder and the viewing trading entity and the quantity available to the trading entity based of available unilateral or bilateral credit. The displayed market book may consist of individual order prices and quantities, aggregated prices and quantities, and/or average prices at predetermined quantities.

Japanese Pat. No. 55-37661, issued on March of 1980, summarizes a method to obtain a foreign goods total system. This system includes goods controlled by a host computer with an information file for foreign goods or business. The system also controls the shipments of the head office and terminal equipment in branch offices connected to the host computer via transmission circuits.

Most sites on the Internet are primarily limited to situations in which the sellers advertise a product or service by posting a listing on an electronic bulletin board which can be read by potential buyers. Many auction based systems require the payment of a fee in order to gain authority to utilize the database.

Most auction based systems simply perform an item-by-item listing of products or services being offered for sale. In high volume trading, the process usually is more complicated. Instead of searching each product or service to find a desired item, there is a need in the art for tailoring a search according to a variety of criteria such as lowest price, best value, vendor performance, audits, ratings, past choices based on recurring buying patterns learned by the system, etc.

The auction based system needed in the art would permit a buyer to avoid spending unnecessary time looking through catalogs, and the seller spending unnecessary costs through advertising. In this auction based system, it would be beneficial for the seller to narrow contacts with potential buyers to those more likely to consummate a transaction.

None of the above inventions and patents, taken either individually or in combination, describe or teach such an auction based system.

SUMMARY OF THE INVENTION

In one implementation of the present invention, a method is provided for an auction. The method receives, through a network, a request for an item from a first machine, the request for the item being based on a performance specification of the item. The method sends, through the network, the request for the item to a second machine. The method then receives, through the network, a bid from the second machine, the bid being based on the request for the item.

In another implementation of the present invention; a method is provided for the auction. The method receives, through a network, a request for an item from a first machine. The method sends, through the network, the request for the item to a second machine and to a third machine. The method receives, through the network, a first bid from the second machine and a second bid from the third machine, the first bid and the second bid being based on the request for the item. The method then determines (i) a first result of an auction based on the request for the item and the first bid, (ii) a second result of an auction based on the request for the item and the second bid, and (iii) a third result of an auction based on the first result and the second result.

In another implementation of the present invention, a method is provided for the auction. The method receives, through a network, a first request for a first item from a first machine, and a second request for a second item from a second machine. The method then sends, through the network, a third request for a third item to a third machine, the third request for the third item being based on (i) the first request for the first item and (ii) the second request for the second item.

In another implementation of the present invention, a method is provided for the auction. The method receives, through a network, a request for an item from a first machine. The method sends, through the network, the request for the item to a second machine and to a third machine. The method receives, through the network, a first bid from the second machine and a second bid from the third machine, the first bid and the second bid being based on the request for the item. The method then determines a third bid, the third bid being based on (i) the first bid and (ii) the second bid.

In another implementation of the present invention, a method is provided for generating a request for an item. The method determines the request for the item based on at least one of (i) an item to purchase, (ii) a performance specification of the item to purchase, and (iii) a term of a request for the item to purchase. The method then sends, through a network, the request for the item to an auctioneer machine server.

BRIEF DESCRIPTION OF THE DRAWINGS

FIG. 3 depicts one implementation of a page illustrating case studies of auctions.

FIG. 5 depicts one implementation of a page illustrating a credit card report.

FIG. 7 depicts another page of the implementation of FIG. 6.

FIG. 8 depicts one implementation of a page illustrating bid results of an auction.

FIG. 9 depicts one implementation of a page illustrating create a cart.

FIG. 14 depicts one implementation of a page illustrating a report of an auction.

FIG. 16 depicts one implementation of a page illustrating a loosing bid result.

FIG. 17 depicts one implementation of a page illustrating a winning bid result.

DETAILED DESCRIPTION

Figure 1:
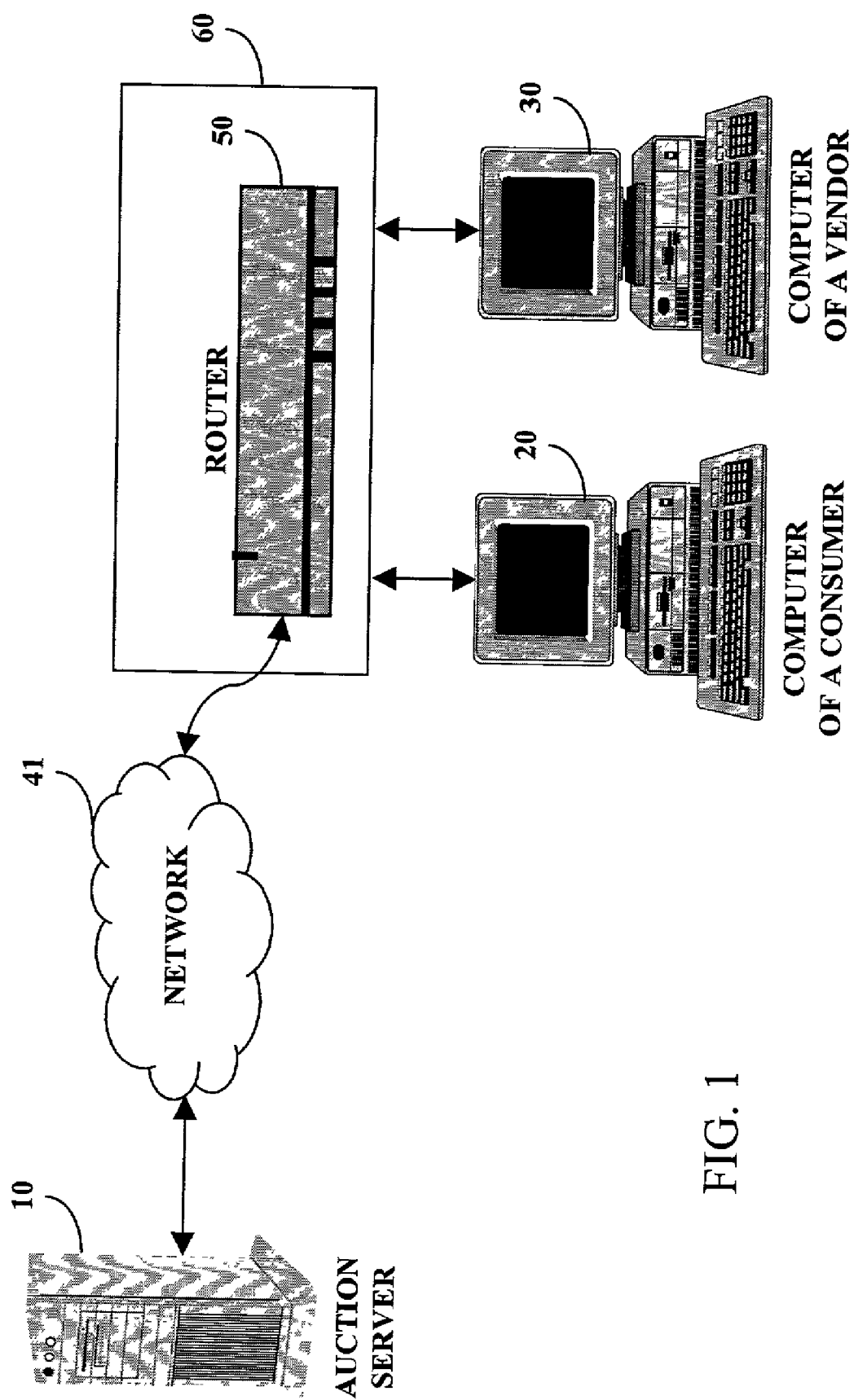
FIG. 1 depicts a simplified diagram of network communications.

One embodiment of the present invention includes an auction based procurement system utilizing performance based auctions, where both buyers and sellers through pooling may take advantage of volume discount pricing. The embodiment uses a network communications (e.g., the Internet). The auction based procurement system may include four stages.

The first stage includes a request for a quotation that a buyer initiates. The buyer may review several databases of historical and present (or active) data to generate the request for the quotation.

The second stage includes quotation submission and analysis. The buyer creates and submits the request for goods and/or services. The buyer may establish specific terms of an auction such as: vendor type (e.g., socioeconomic classifications or geographic locale), auction closing date, auction closing time, time zone of closing (e.g., EST, PST, etc), evaluation criteria (e.g., exact match, or meet or exceed), and award criteria (e.g., best value or low price). The buyer may use a catalog to guide the product/service selection. The buyer may also create and define custom items using suggested item definitions or ontologies. The embodiment may use a performance based request of the item (e.g., product or service) to potential sellers/vendors. As such, the embodiment may guide the buyer to define the item by performance, or brand or model number. Then, a buyer may procure a complex scope-of-work such as an installation of light fixtures similar to a commodity item such as paperclips. A template populated with items sought allows the buyer to experience ease in the procurement of the items. Vendors may respond through quotations to the buyer's request for the item, for example, by combining the vendors' bids. A ranking of the information provided by the buyers and/or the sellers may be performed. The ranking may be based on price, best value, or features of a request for an item. An award based on best value or low price may be determined. The calculation of best value considers the price of a bid, as well as factors such as past performance, warranty, risk, and features, which define an item. For example, an item having 5 characteristics may have 5 "features" to consider. Features may be quantified by assigning a point value to each. For example, a feature may be assigned a "0" value for each "meet" specification and a "1" value for each "exceed" specification. Vendors may be notified of their response ranking, though a vendor may be a winner or looser of the auction or the vendor may lead or lag in the auction.

The third stage includes award notification, product shipping, and proof of shipping. Once a buyer is notified of the winning award, the buyer may cancel the submitted bid (e.g., system error) or repost the bid to a new pool. The buyer may contact customer service for mediation if the bid is "less than" the equal or better than the criteria of the buyer. The buyer may also accept the winning award (unless a systems error occurred). The embodiment allows buyers to accept a bid without having to evaluate the qualification of all the submitted bids. Acceptance of the winning award is not mandatory. The embodiment also allows buyers to purchase substitute items that are equal or better than the original submitted requirement.

The fourth stage includes payment, either online payment using an escrow account or an offline payment. In the offline payment the buyer may contract directly with the winning vendor. For escrow account payment, the buyer may advance funds upon proof of shipment of the item to cover the purchase. The escrow account may be used to distribute fees to the vendor, the shipping agent, and the auction system. The embodiment may notify each buyer of their savings from using the auction.

The detailed description refers to the accompanying drawings, where similar reference numerals correspond to similar features throughout the drawings, that illustrate embodiments of the present invention. Other embodiments are possible and modifications may be made to the embodiments without departing from the spirit and scope of the invention. Therefore, the detailed description is not meant to limit the invention. Rather the scope of the invention is defined by the appended claims, and their equivalents.

The Internet is a well-known, global network of cooperatively interconnected computer networks. The World Wide Web ("Web") portion of the Internet is a collection of server computers that store documents (i.e., Web pages), which are typically accessible by the public. A Web page consists of text, graphic, audio/visual, and the like (i.e., multimedia). An Intranet is similar to the Internet. Intranets, however, restrict access to the network to users outside of a defined group, such as users who are not employees of a corporation. Hereinafter, any description of the Internet also is applicable to an Intranet.

FIG. 1 shows a simplified diagram of network communications. Computer 10 operated by a consumer and computer 30 operated by a vendor are coupled to an Internet Service Provider ("ISP") or a Network Service Provider ("NSP") 60. The Internet Service Provider ("ISP") provides Internet access to operators of computers 20, 30, while the Network Service Provider ("NSP") provides Internet access to the ISPs, as well as the operators of computers 20, 30. The ISP/NSP 60 includes a router 50 that is coupled to auction server 10 via a network 41 (i.e., the Internet or Intranet). A browser, which runs on each of computers 20, 30, retrieves (or downloads) Web pages from the auction server 10. The browser allows the operators of computers 20, 30 to navigate (or "browse") between Web pages. In the system of FIG. 1, for example, consumers will be able to combine requests for purchase of goods and services from a plurality of vendors to obtain volume discounts.

A buyer 20 submits a request for goods and/or services and vendors 30 respond with bids. A server 10 may review databases of historical and present data to guide/aid the buyer 20 in creating and submitting a request for an item that will achieve the lowest price or best value for the item. The server 10 may notify all bidding vendors 30 of the existence of a lower bid. The server 10 may communicate the status of a bid to a bidding vendor in a "sealed or closed" fashion by displaying a "lead or lag" value, or in an "open" fashion by displaying the actual leading price/point.

A sales forecast report may be created to offer the vendor/seller an automated took to capture the value of potential sales opportunities being processed by the server 10, which has real-time access to the status of all vendor bids. The status of a bid may be "lead" (winning bid at a point in time) or "lag" (loosing bid at a point in time). The server 10 may calculate a total dollar value of the difference between the lead bids and the lag bids. Proprietary bidding software packages residing on a vendors network or workstation, however, does not have access to such information.

The embodiment includes a supply and demand based transaction model. Volume based discounting is correlated with supply and demand. The embodiment is based on a bilateral buyer driven process which may be utilized by organizations that would like to purchase significant amounts of goods or services at the lowest possible price or best value. Buyers 20 and sellers 30 may review different sources of data before submitting a bid or quotation.

Figure 2A:
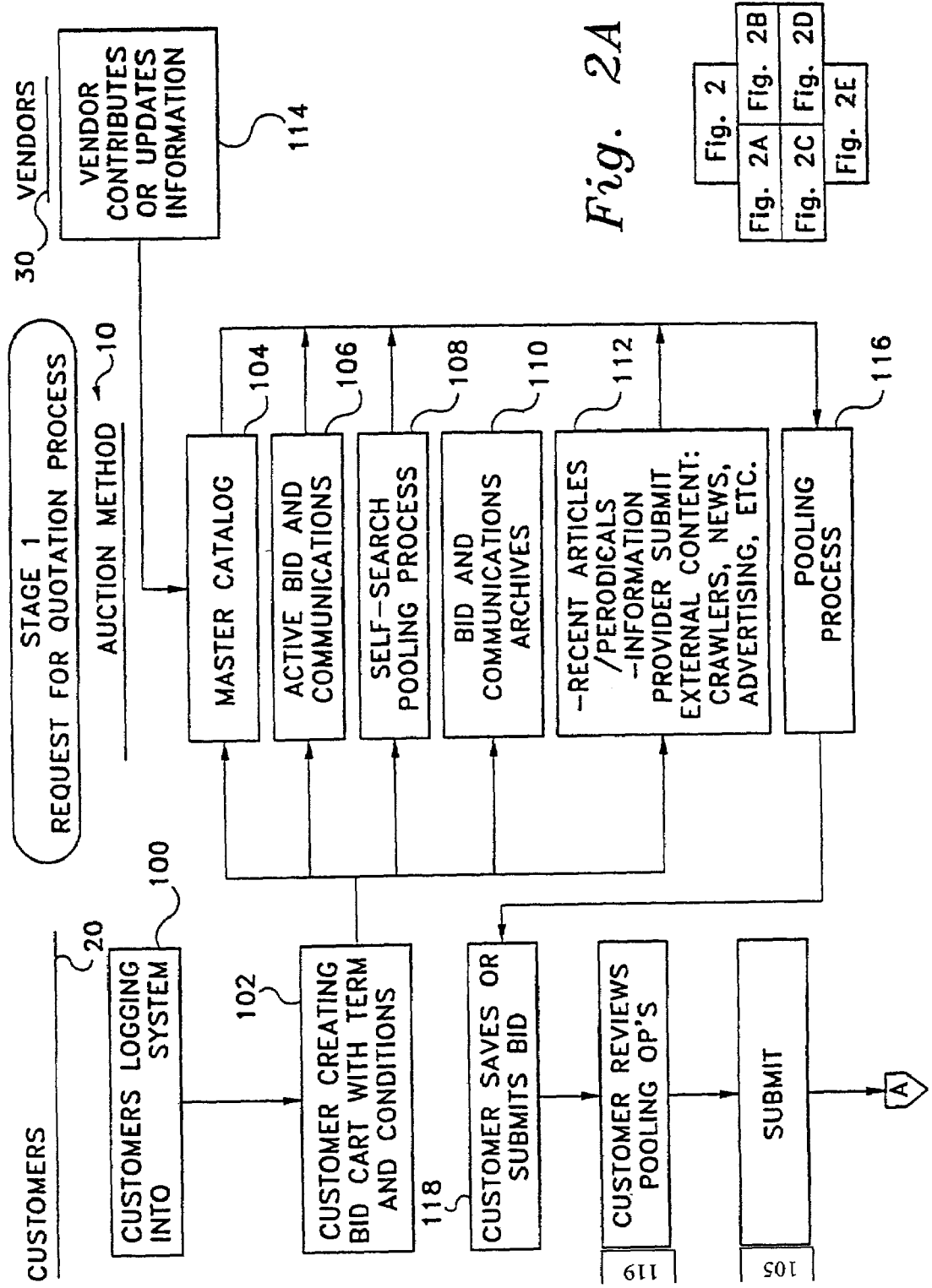
FIG. 2A depicts a flowchart showing one implementation of an auction based procurement system.

FIG. 2A illustrates one implementation of a first stage of an auction based procurement system. The embodiment may be a virtual marketplace for controlled interactions between buyers 20 and sellers 30. These interactions may be optimized to facilitate monitoring and auditing of the system to ensure integrity and to produce detailed audit trails of every interaction with the server 10.

Buyers 20 may initiate the bidding. Sellers 30 respond through quotations to the buyers' auctions. The embodiment may include a personalized login access where both buyers 20 and sellers 30 may log onto the server 30 to obtain specific information, which may be provided by each business entity involved. First, the auction provides a site accessing system where through membership, identification codes for buyers 20 or sellers 30, access to specific information stored in the server 10 may be gained. The server 10 may present customized and personalized content based on historical interactions.

Once each buyer 20 logs 100 onto the auction, the buyers 20 have an option of reviewing different data sources 104, 106, 108, 110, and 112 in creating a bid cart 102. A bid cart may include specific information that the buyers 20 require of each product or service for bidding.

The bid cart may include: a) an auction owner's profile information such as organization name, contact name, contact numbers, credit card numbers, etc., b) the specific items sought from the auction, c) best value calculation logic and weightings, d) shipping information, and e) contractual terms and conditions. The auction may enhance the purchasing experience for both buyers 20 and sellers 30 by offering intelligent, practical and useful information that may be customized and pushed to a particular end user (e.g., through data mining).

The data sources 104, 106, 108, 110, and 112 from which each buyer 20 may retrieve information include a master catalog 104, active bid and communications 106, an automated pooling process 108, bid and communications archives 110, and recent and past external content 112. With most catalog systems the buyers 20 expend a great deal of time and effort sorting through each item to find a relevant item.

The master catalog 104 may be a dynamic data repository of item information to help the buyer 20 define performance specifications of an item. Disparate data sources such as OEM product catalogs, distributor catalogs, and reseller catalogs may be normalized for the data repository. The master catalog 104 may include product specifications, product image files, and suggested retail prices. The master catalog 104 may provides information to consumers 20 who are registered with the system.

The master catalog 104 may retrieve data from various disparate sources via commercially available push and pull technologies, which include transfers of fixed and variable file formats, interfacing to various databases, XML, OBI, and other distributed database connectivity sources. The master catalog 104 may also allow consumers 20 to retrieve product information through a standard database interface to determine create an auction and to search for like auction. The master catalog 104 may be accessed by remote buyers 20 through the network 41.

Historical data may be accumulated and stored in a database where specific information may be accessed based on the buyer's need for products and services. The historical auction data may be a compilation of closed transactions, which may be (a) all auctions submitted, (b) all vendor bids submitted, (c) all auction awards, and (d) all associated messages between the involved parties 20 and 30. The historical data may be retrieved and utilized during any search, create auction, create bid, or create report activity or data mining or artificial intelligence activity.

The buyer 20 may also retrieve data from active bid and communications 106. The active auction data 106 may include data from open transactions such as a) all auctions submitted, b) all vendor bids submitted, c) all associated messages between the involved parties 20, 30. The data 106 may be retrieved and utilized during any search, create auction, create bid, create report, or data mining or artificial intelligence activity. The buyer 20 may also observe active auctions 106 to determine the status of bids related to products or services of interest.

The self-searching pooling process 108 may be a manual process where a buyer 20 or vendor 30 initiate a search to find equal or better opportunities from historical and/or active opportunities. The buyer 20 may conduct the search of products and services.

Each buyer 20 may review the bid and communications archives 110, which are stored in a database. The bid and communications archives 110 database may include all submitted bids and communications between buyers 20 and sellers 30.

External product and service information 112 may not be concentrated in one database for buyers 20 and sellers 30 to review. The embodiment accumulates this information, which is stored in a database, updated and made available to all buyers 20.

Each vendor 30 may contribute and/or update information 114 in at least one of the various data sources 104, 106, 108, 110, and 112. The vendor 30 may provide accessible information concerning prior trading transactions or information about the vendor's products and services. The buyer 20 may review the different data sources 104, 106, 108, 110, and 112. The server 10 may conduct its own pooling process 116 to further aid each buyer 20 in creating the best possible bid cart 102. The pooling process 116 may include an automated process, which utilizes data mining and artificial intelligence technologies to proactively compare and analyze active bid and communications 106 opportunities to produce a list of equal or better pooling opportunities to the buyer, or suggest new pooling opportunities between buyers based on their prior purchases.

The embodiment may accumulate data to anticipate the final auction 102 of the buyers 20. The pooling process 116 may use trending information that has been historically, collected, mined, processed and modeled from prior transactions.

Buyers 20 may be given product and service information that is equal or better to the information searched through the data sources 104, 106, 108, 110, and 112. Vendors 30 may also be presented with volume sale opportunities that may include different features on similar products or services. The data 104, 106, 108, 110, and 112 may also be used to generate standard business reports, quantitative analysis on market trends, demand forecasting and correlation analysis.

Other types of advice from the pooling process 116 may include suggesting pre-determined courses of action based on past choices and available information. For example, recreating bids 102 based on recurring buying patterns learned by the server 10. After the customer saves or submits a bid 118, the customer may review the pooling options 119 to submit the bid or an alternative bid 105.

The embodiment may involve past and future transactions to present submitted bids. The embodiment may anticipate the needs of its users 20 and 30 and proactively search for and facilitate aggregated buying opportunities based on historical bidding patterns.

Figure 2B:
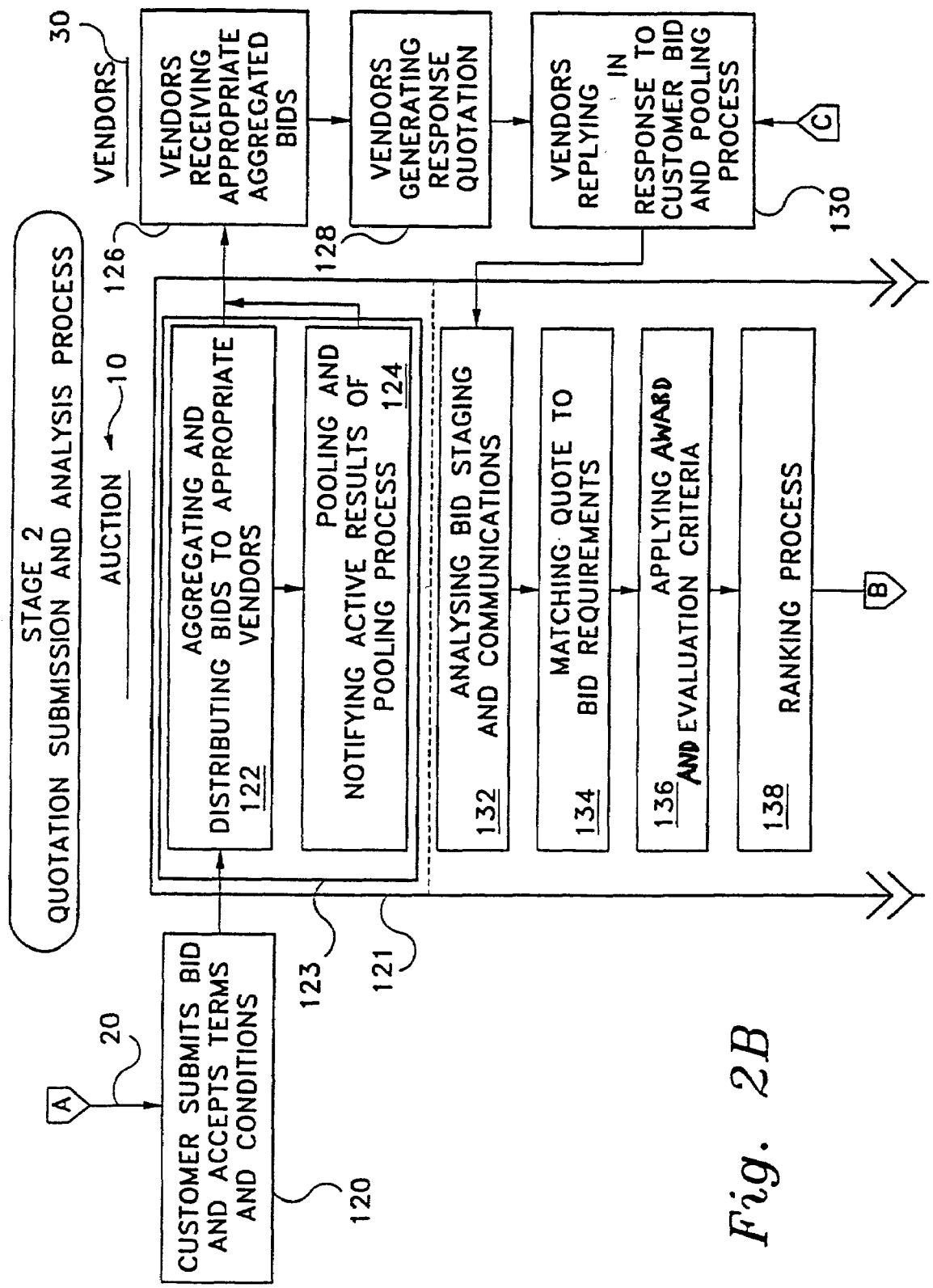
FIG. 2B depicts a flowchart showing one implementation of an auction based procurement system.

FIG. 2B illustrates one implementation of a second stage of the auction. The buyer 20 may save the information gathered in creating 118 their bid cart and return to submit a bid (se FIG. 1). The buyer 20 may further analyze the data sources 104, 106, 108, 110, and 112.

The buyer 20 may submit 120 their bid, which may then go into the pooling process 121. If the buyer 20 submits 120 the bid, the bid will formulate a detailed written specification setting forth the quantities and requirements of the item to purchase.

Once a bid has been submitted 120, the embodiment aggregates 123 and distributes 122 the submitted bid to the appropriate vendors 30. The embodiment may aggregate 122 information of similar auctions by comparing auction specifics such as feature set, auction end date, and award criteria (lowest price or best value). The embodiment notifies 123 the vendors 30 by comparing the auction's a) category and b) sub-category classifications and performing a lookup on a cross reference list which represents vendor's participation in that category and sub-category.

The notification 124 may then be sent anonymously to the registered vendor 30 through a user-defined communications preferences such as e-mail, paging, voice mail, etc. While the vendors 30 are being notified 122 of the aggregated and distributed bids, the embodiment may proactively pool and notify 124 each vendor 30 of the active results of the pooling process. Each vendor 30 may receive 126 and may generate 128 a response bid to each item that is an individual or aggregated/pooled auction 122.

The vendor 20 may generate 128 a bid response or quote by completing vendor fields within an auction's item detail. Bid responses 128 may be submitted anonymously within the embodiment. This eliminates the need for outside paper, or fax submissions as well as minimizing the risk of circumvention of the procurement system and collusion between buyers and sellers. Once each vendor 30 has generated 128 a response quotation, the vendor 30 may reply 130 in response to the buyers' 20 bid and pooling response 124. The embodiment may weigh all information and criteria specific to each buyer's bid 120.

An award 148 may be based on best value or lowest price. If the award criteria is based on best value, the embodiment may analyze all vendor 30 quotes and responses by executing the best value calculation process. The embodiment analyzes bid staging and communications 132. The best value program may measure, weigh, and compare the features and risks associated with a specific vendor's response/quotation 128 and 130. The best value model may use auction specific, product specific, and vendor 30 specific information to validate and rank bid responses. The rank may be based on user-entered weightings for each feature to produce relative score of the bids. The embodiment may match vendor quotes to buyer bid requirements 134. The embodiment may also apply 136 an evaluation criteria based on vendors performance, audits, and ratings as a part of the best value calculation. The embodiment may proceed to a ranking process 138 to arranges and sort various information provided by both buyers 20 and sellers 30.

Figure 2C:
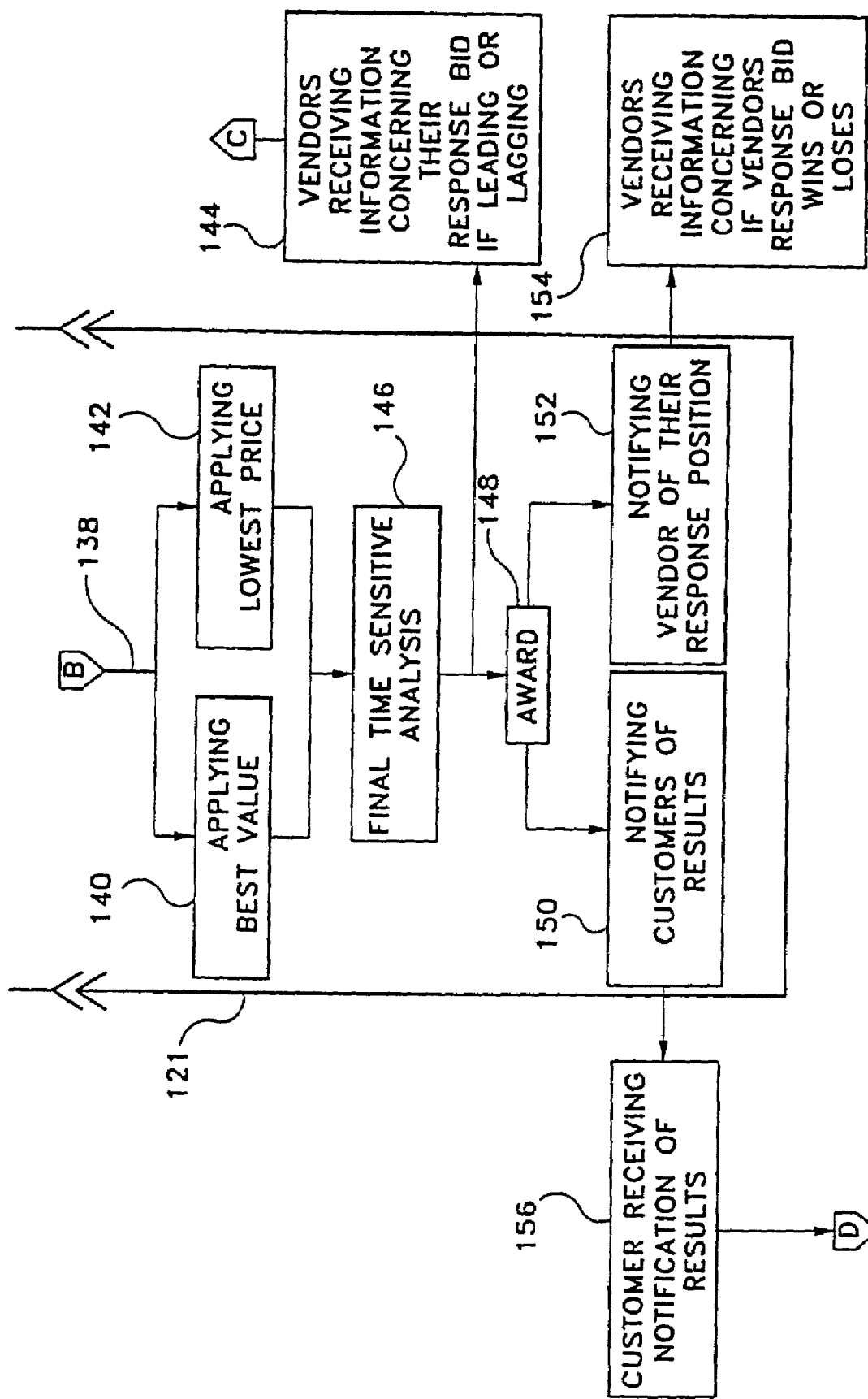
FIG. 2C depicts a continuation of the flowchart of FIG. 2B.

FIG. 2C illustrates one implementation of the second stage of the auction. Each buyer may receive the final ranking 138 on best value 140 or lowest price 142. The embodiment may notify each vendor 20 of the bid status, which may be a leading bid or a lagging bid 144.

Vendors 30 may reply 144 to the ranking through the bid and pooling process 121. The process 121 may be repeated manually or automatically by preauthorizing re-bids in predetermined increments triggered by volume and/or pricing thresholds. The process 121 may come to a halt based on a time-sensitive deadline 146, which may be set by the potential buyer 20.

After the deadline 146 is reached, the buyers 20 and vendors 30 may be notified of the results 150 and 152. The embodiment may notify 152 each vendor 30 of their response position whether they were awarded the auction. The embodiment may also notify 150 all buyers 20 of the results of the winning award 148. Each customer receives 156 the notification of results. Vendors 30 may receive 154 information concerning whether the vendors response bid wins or loses.

Figure 2D:
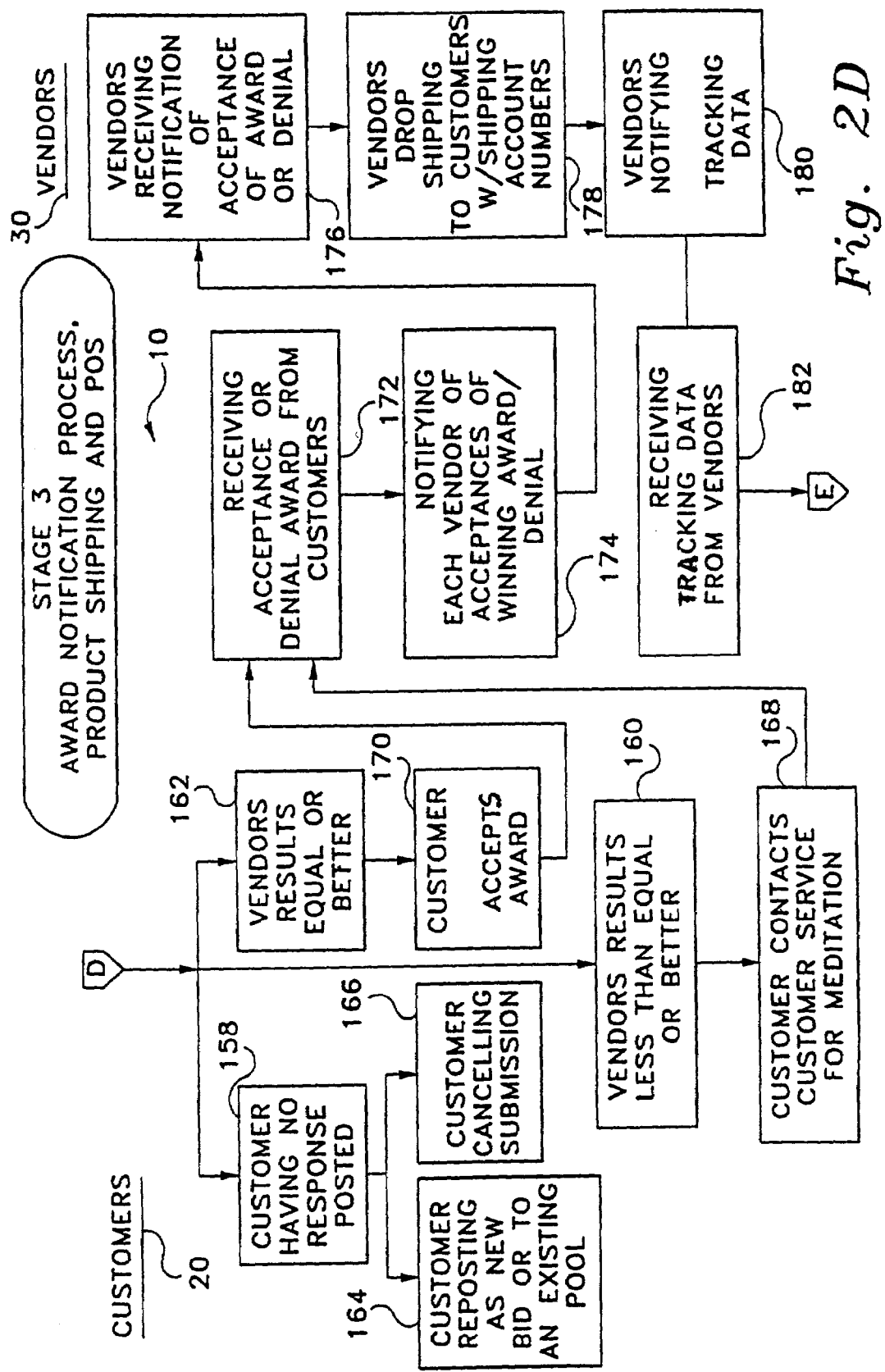
FIG. 2D depicts a flowchart showing one implementation of an auction based procurement system.

FIG. 2D illustrates one embodiment of the auction. The buyer 20 may be notified 158 that there was no responses posted for their bid(s). The buyer 20 then may cancel 166 the submitted bid, or submit/repost 164 the auction as is, and assume the lead position for other buyers to pool into.

The vendor's response may result 160 in less than "equal or better" than the specifications of the submitted bid. The buyer 20 then may contact 168 customer service for mediation. A customer service staff operates to solve customer issues regarding less than "equal or better quotations," requests, complaints, and other customer-related issues. When issues are resolved between the customer service and the buyer 20, the buyer 20 may accept the award 172.

The vendor's response 162 may generate the lowest price or is "equal or better" than the buyer's submitted bid. The buyer 20 then may accept 17 the winning award and may provide the vendor with further information on shipping and payment. Once server 10 receives 172 the notice of acceptance from the buyer 20, server 10 may record and notify 174 each vendor of the acceptance.

The auction system may offer shipping considerations for CONUS (within the CONtinental U.S.) and OCONUS (Outside the CONtinental U.S.) deliveries and may allow the buyer 20 to select various shipping service levels such as: overnight express, and standard ground.

Once vendors 20 receive notification 176, vendors may ship 178 the item to buyer(s) 20 using, for example, delivery accounts numbers. The vendors 30 may notify 180 server 10 of the tracking data. After server 10 receives 182 the tracking data, server 10 may store the shipping information in a database where both buyers 20 and sellers 30 may then retrieve this information.

Figure 2E:
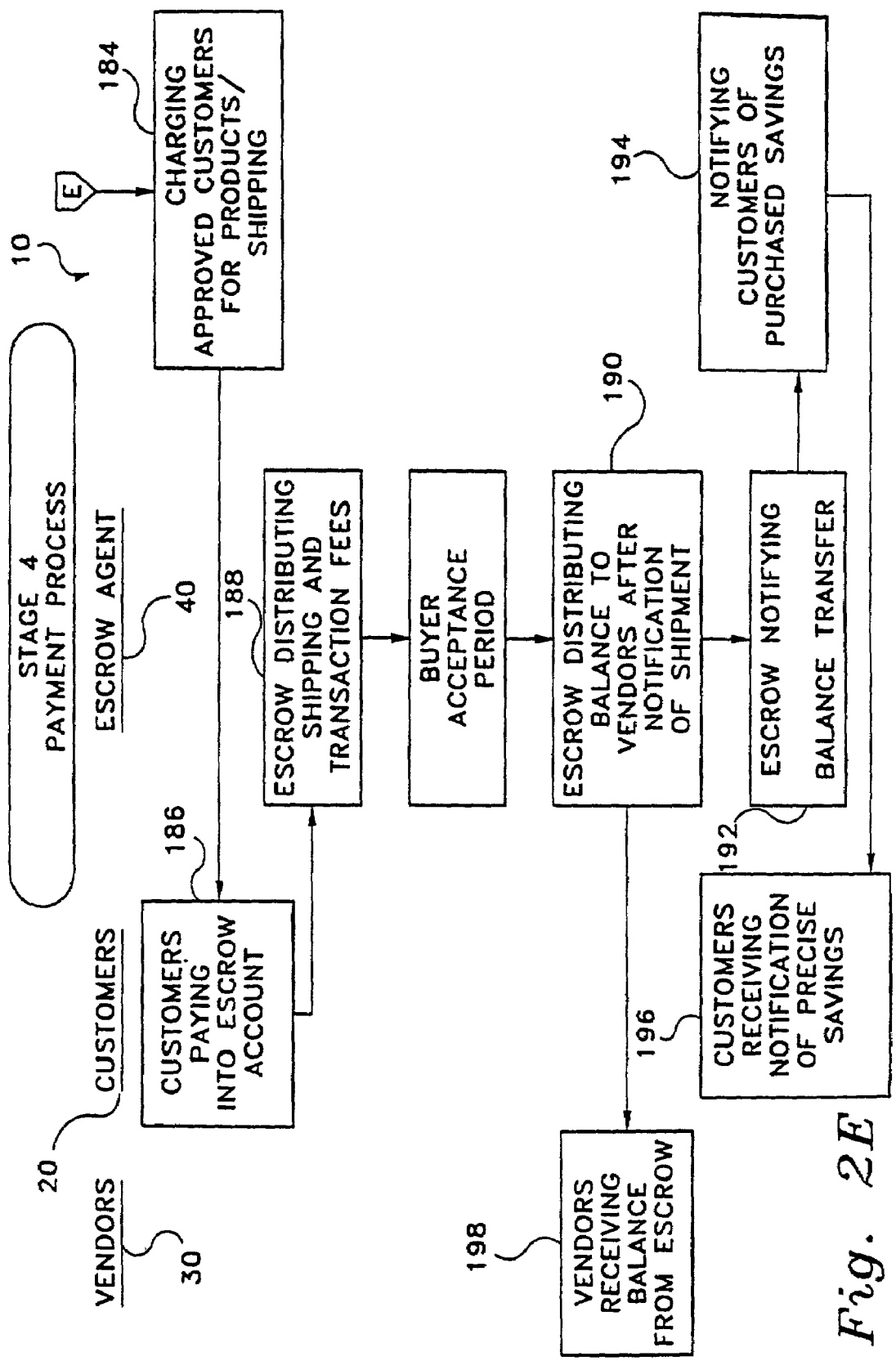
FIG. 2E depicts a flowchart showing one implementation of an auction based procurement system.

FIG. 2E illustrates one embodiment of the fourth stage of the auction. Server 10 may charge 184 the approved buyers 20 for products or services purchased through the auction and also for shipping fees. Server 10 may operate through an escrow account system 40. The escrow payment system 40 may involve the use of an escrow account associated with the buyer 20 where the funds may be advanced by the buyer 20 to cover the purchase of desired goods or services. The funds may be kept in the escrow account until the vendor accepts and ships the goods. Buyer 20 then pays into an escrow account 186.

The escrow 40 may distribute 188 the buyer's shipping and transaction fees to the appropriate parties. During the buyer acceptance period, transactions through the payment stage may occur. The escrow 40 may distribute 190 the balance of any funds held in the account to the appropriate vendors 30 after notification of shipment. The escrow 40 may notify 192 the balance transfer internally. To complete the bidding, the server 10 may notify 194 each buyer 20 of the purchased savings. The received 196 savings information may be stored in a database, which may be accessed and utilized by participating parties. Vendors 30 may receive the balance from internal escrow after the balance transfer.

Figure 4:
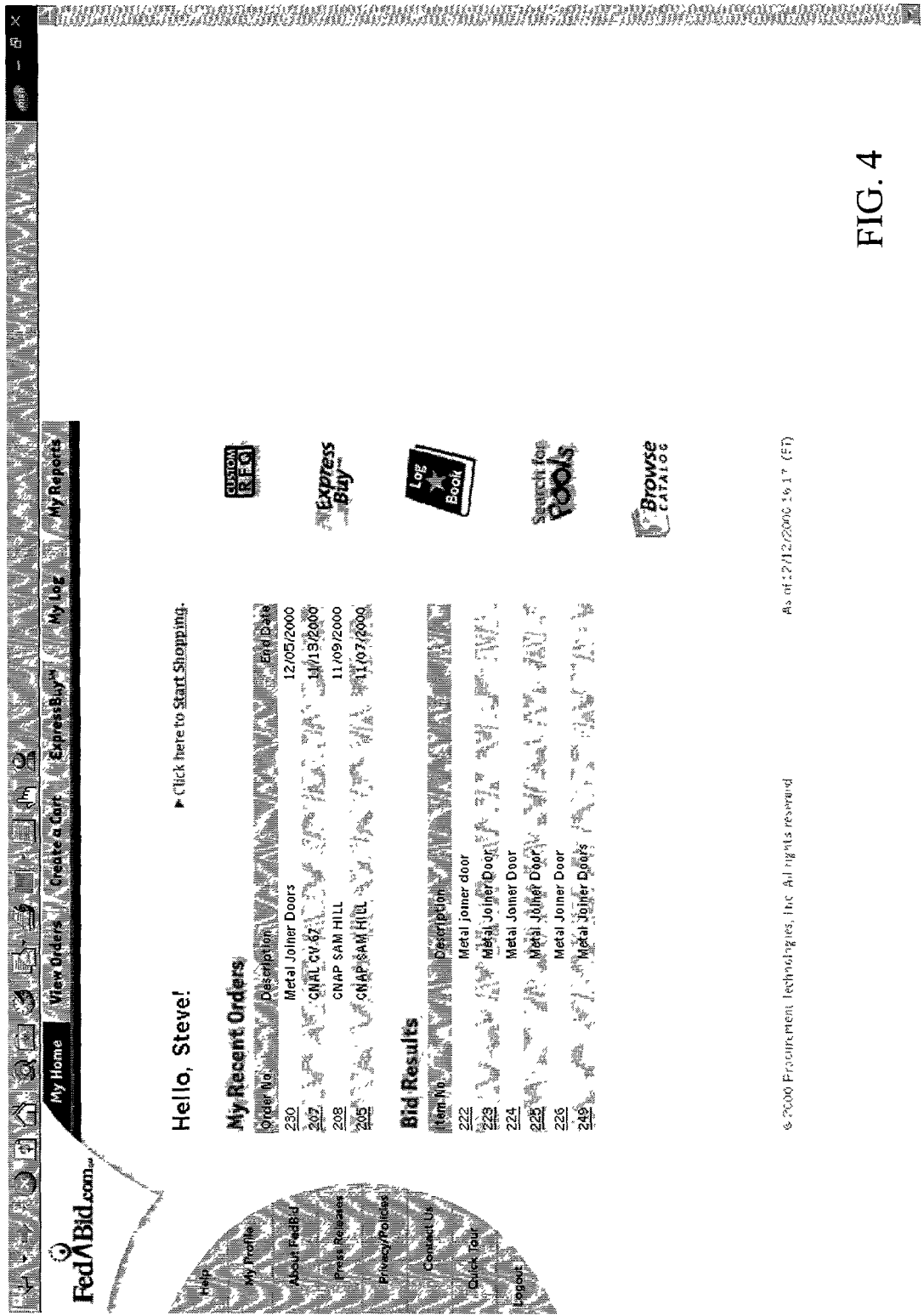
FIG. 4 depicts one implementation of a home page for a consumer.

FIG. 3 depicts one implementation of a page illustrating sample case studies, which may be reviewed. FIG. 4 depicts one implementation of a home page a buyer. The information listed includes current and historical auctions created by the buyer. The tabs at the top of the page provide capabilities such as generate a request for an item and a credit card usage report. The icons on the right of the page are short cuts to a plurality of features.

A report may be created to offer the buyer 20 an automated tool to perform credit card reconciliation. The credit card reconciliation is performed, for example, by government credit card/purchase card users. The user manually compares shipping invoices to credit card statements to verify proper delivery and billing for all purchases. The credit card statement, however, provides only Level 1 data (i.e., date of transaction, vendor, and extended price of the goods). Thus, the user matches the Level 1 data to invoices, which are detailed and may use different order numbers, part numbers, and order execution date. The server 10, however, collects pertinent credit card order data such as vendor information, order execution date, item descriptions, unit prices, extended prices, and shipping information that better matches vendor invoices. The server 10 compiles an electronic report of the credit card order data. The electronic report may then be downloaded by a consumer 20 to reconcile credit card statements. In FIG. 5, for example, the electronic report is modeled based on the U.S. Air Force's 11$^{th}$ Wing District Washington reconciliation reporting requirements.

Figure 6:
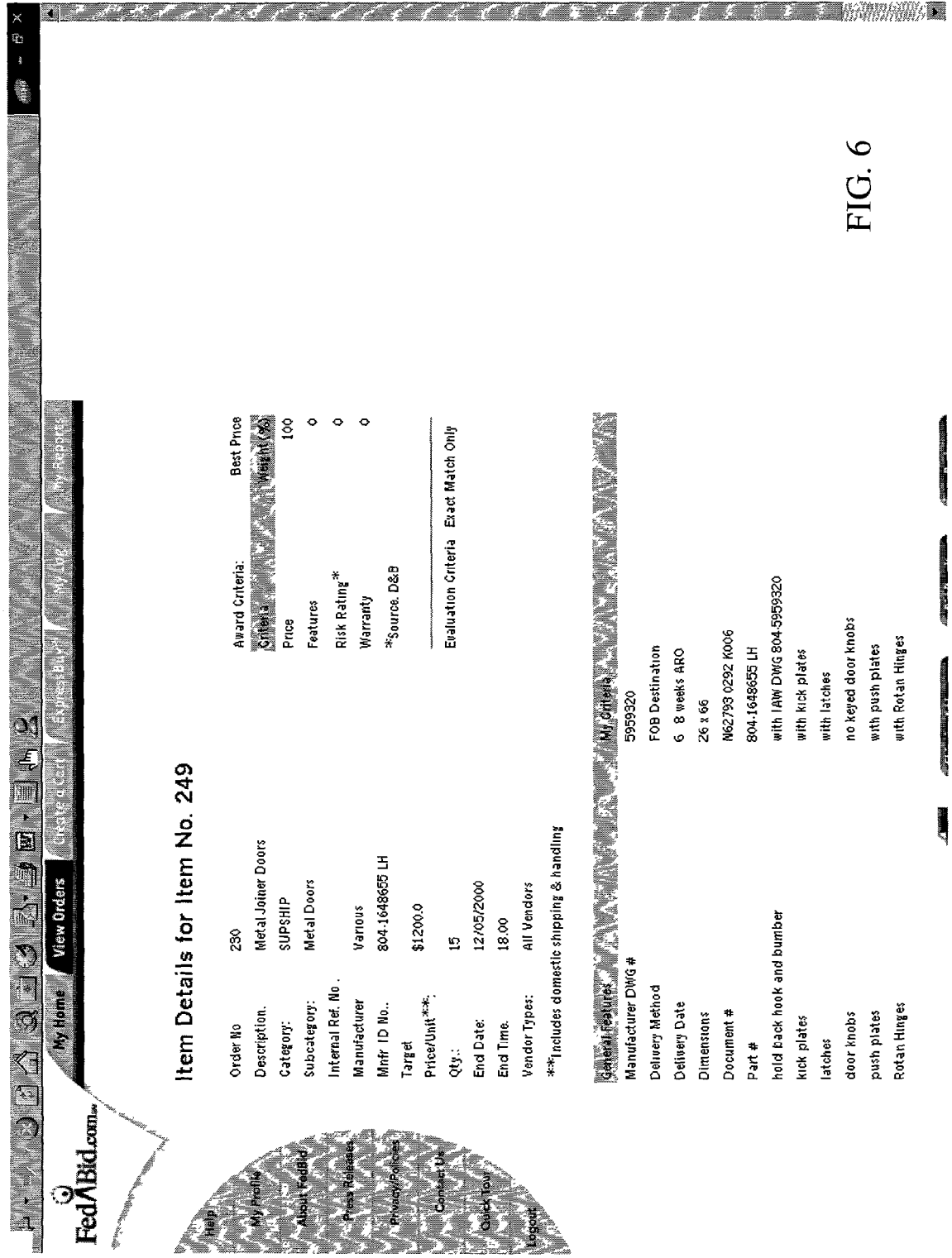
FIG. 6 depicts one implementation of a page illustrating view orders.
Figure 8:
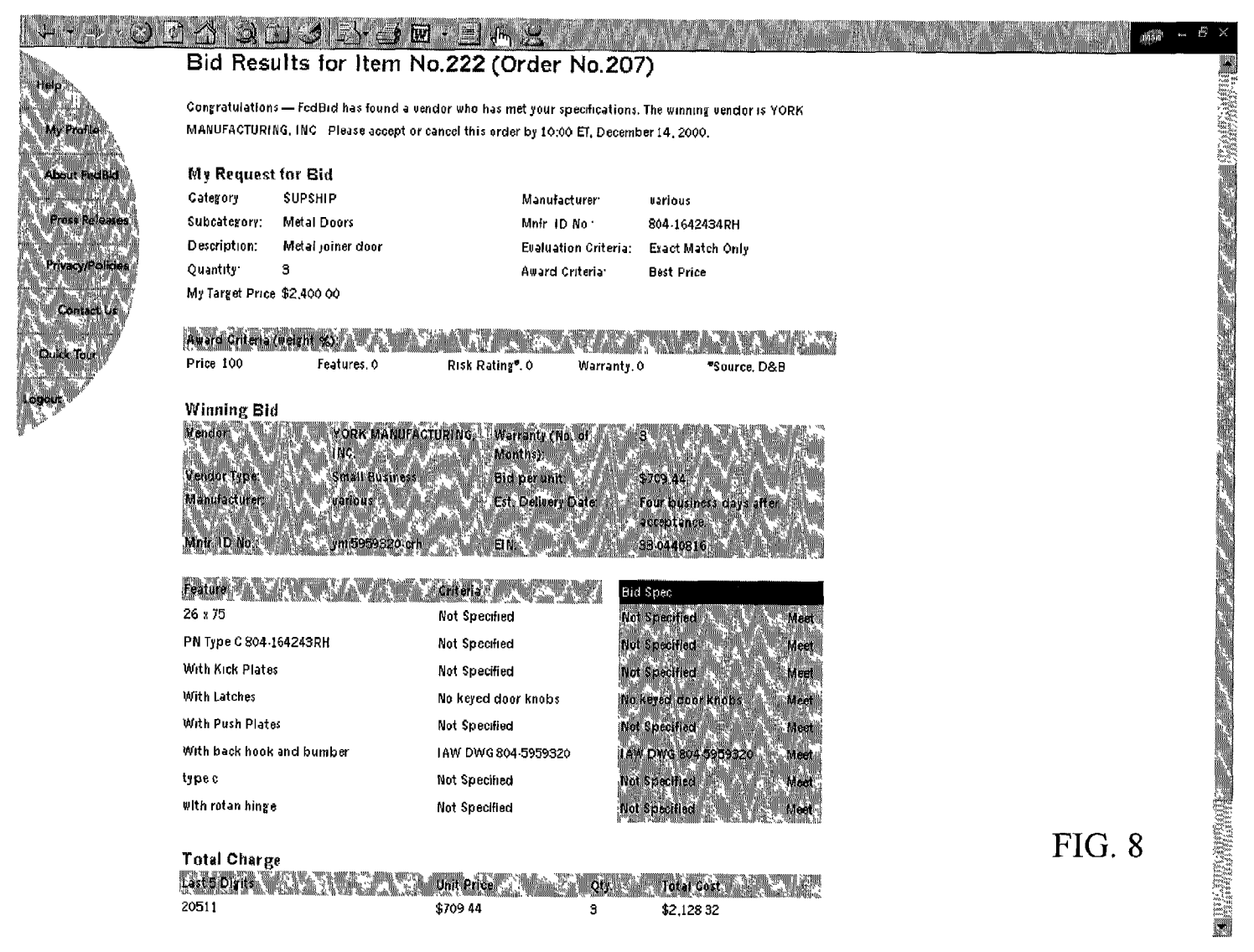

FIG. 6 depicts one implementation of a page illustrating the orders, where the consumer may view information of the existing auctions. FIG. 7 depicts one implementation of a page illustrating a second layer of detail of the participating vendors, the best bid price, and the rank by price, for example. Additional information may also be presented such as time of bid, and all bids vs. best prices. FIG. 8 depicts one implementation of a page illustrating the bid results of an auction. The data may include the winning vendor, the item of the request, the price of the bid, and performance specifications of the item.

Figure 9:
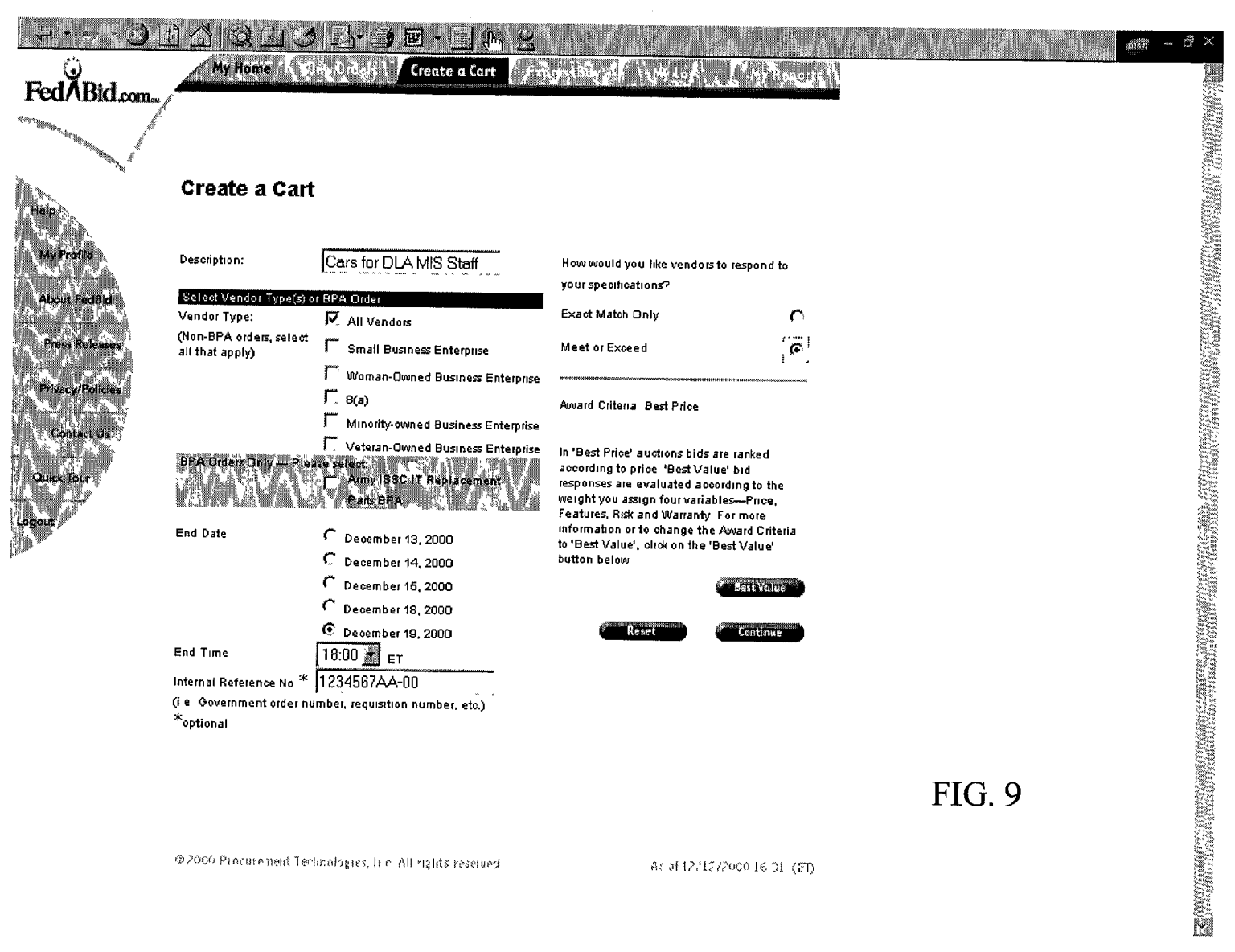
Figure 10:
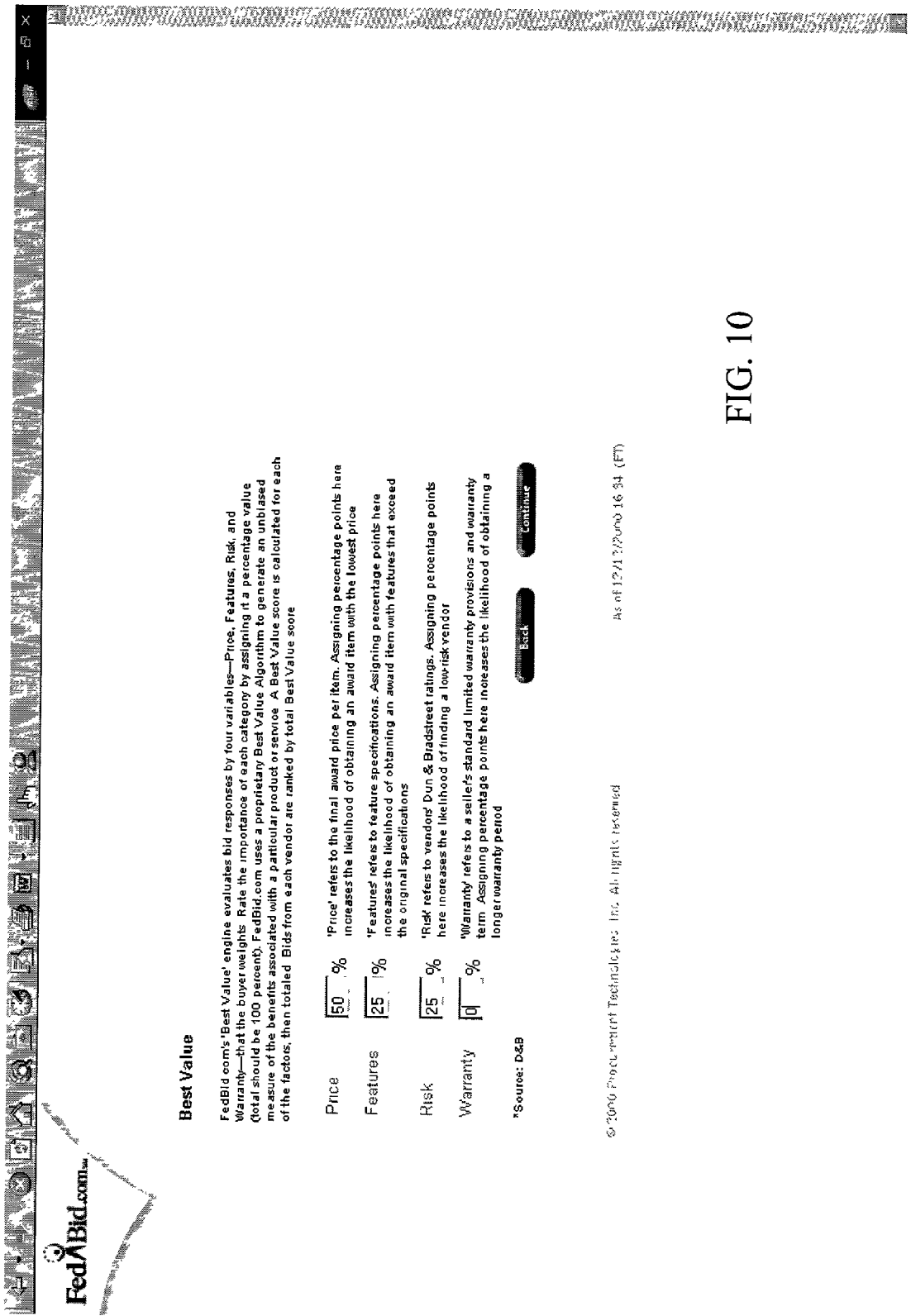
FIG. 10 depicts one implementation of a page illustrating best value.
Figure 11:
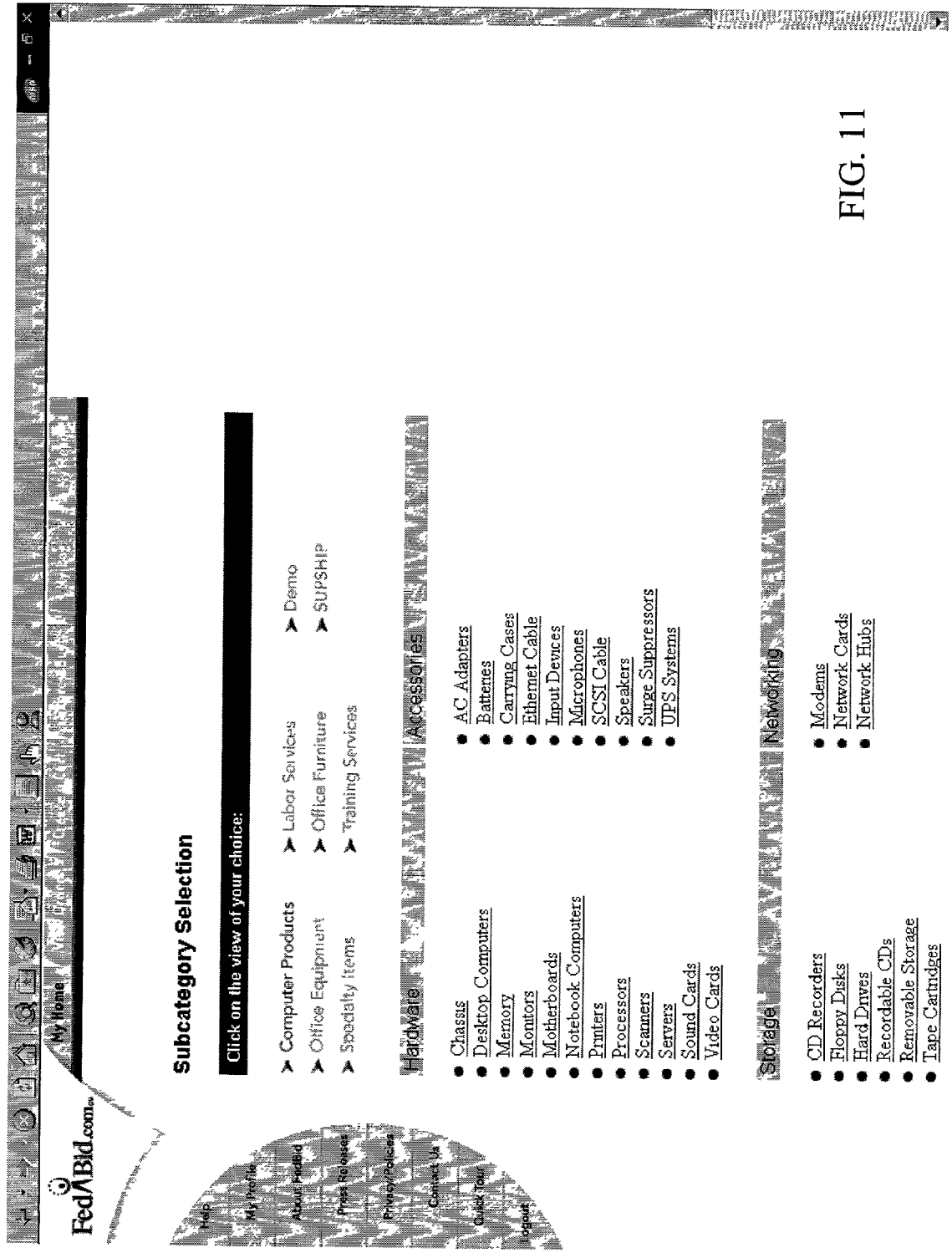
FIG. 11 depicts one implementation of a page illustrating category structure.
Figure 12:
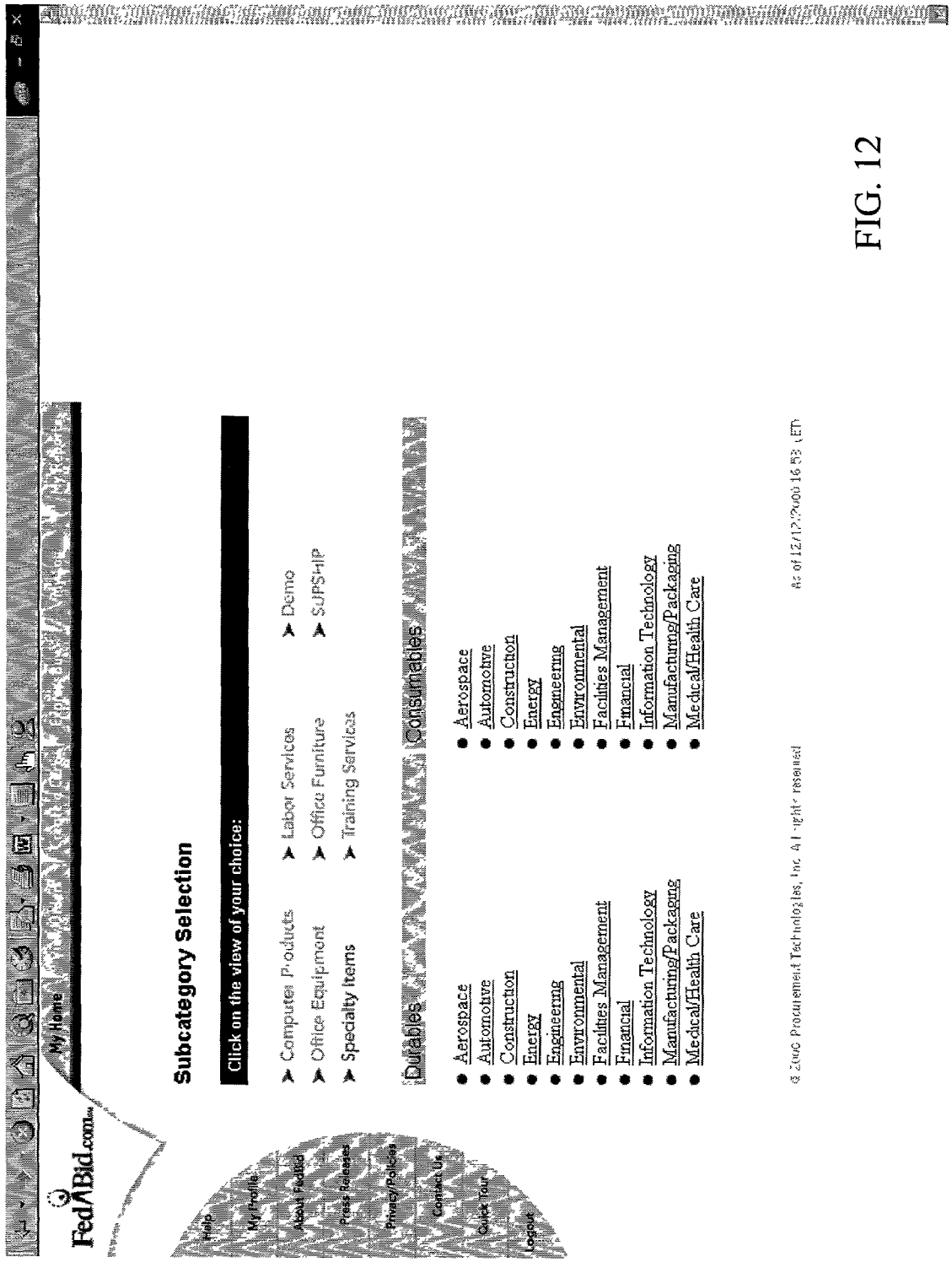
FIG. 12 depicts one implementation of a page illustrating sub-category structure.
Figure 13:
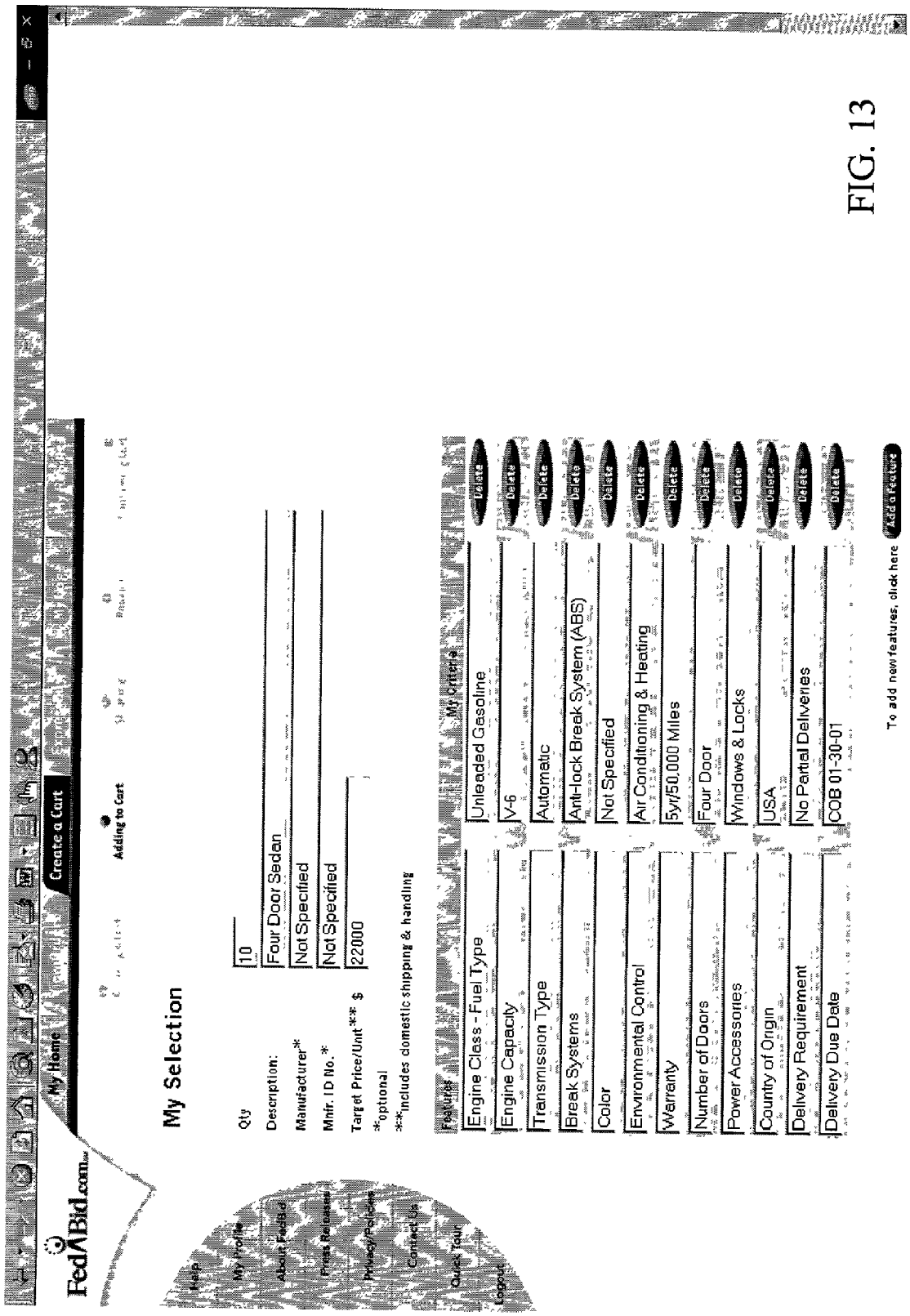
FIG. 13 depicts one implementation of a page illustrating performance specification of an item.
Figure 14:
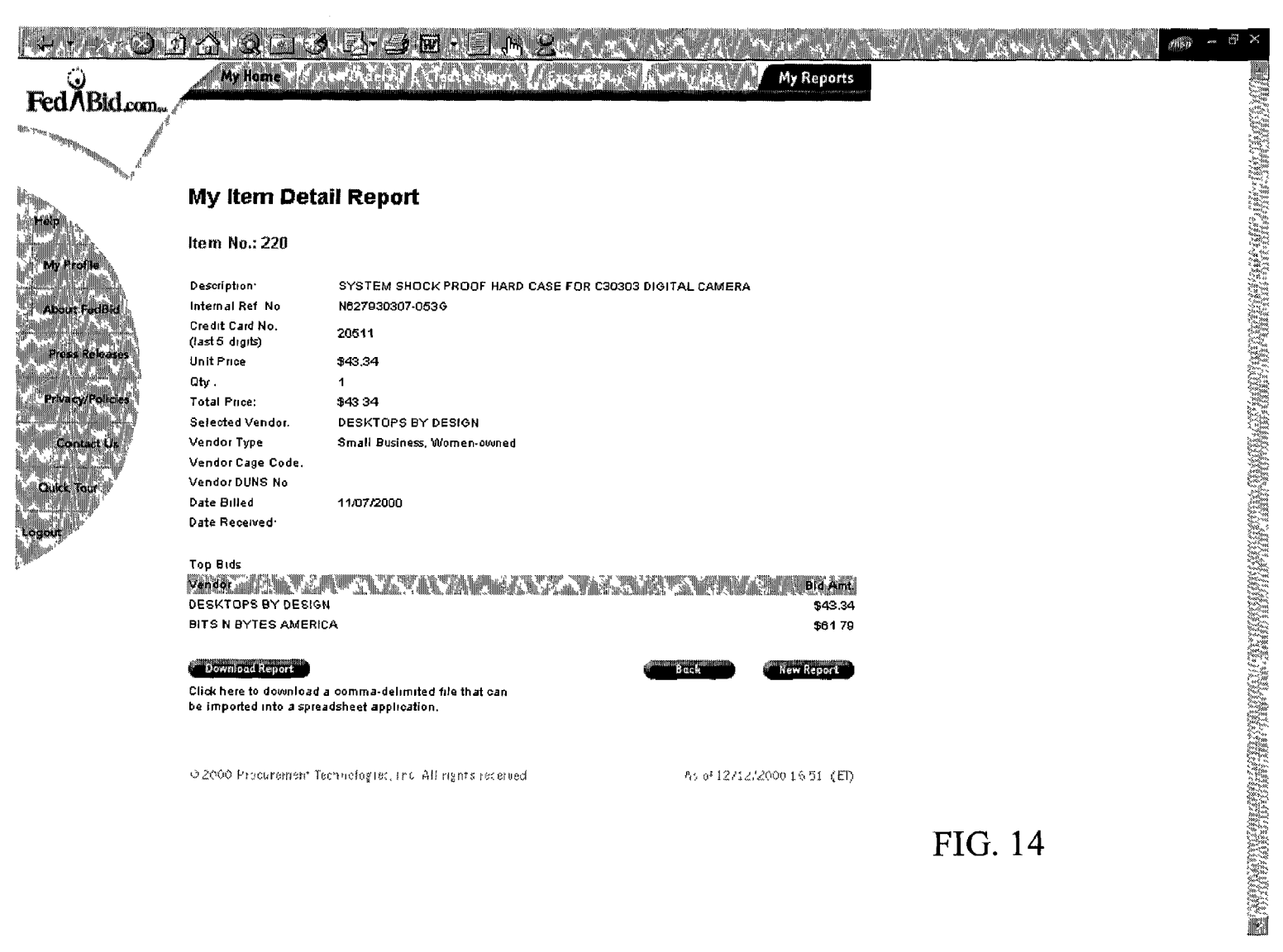

FIG. 9 depicts one implementation of a page illustrating a creating of an auction. The buyer may choose socioeconomic vendor classifications, as well as the duration of the auction and the evaluation criteria. FIG. 10 depicts one implementation of a page illustrating criteria for best value. The page may be customized/personalized. FIG. 11 depicts one implementation of a page illustrating a category structure to define product and service ontologies. FIG. 12 depicts one implementation of a page illustrating a sub-category structure. FIG. 13 depicts one implementation of a page illustrating a template for defining performance specifications for an item (e.g., product and service). FIG. 14 depicts one implementation of a page illustrating a report for the consumer. The report may include the bidders and the bid prices in rank order. In short, the buyers 20 may take advantage of price/volume discounts offered through the auction based on pooling, automatic auditing, and diligent requests, for example.

On the seller's 30 side, the vendors 30 may chart supply curves, take advantage of increased business opportunities in spite of the business size, reduce associated transaction costs, and receive valuable data for manufacturing and sales forecasting. In addition, vendors 30 may bid on products and services (e.g., if no conflict of interests exits). The vendor 30 may take advantage of a volume purchase being made by pooled buyers 20 by joining into the aggregated transaction (i.e., an "impulse buy"). The server 10 may flag potential or actual conflicts.

Large organizations already take advantage of the benefits afforded by a request for quotation because their volume buying represents an opportunity for suppliers to compete for the business. Large organizations also have the resources to communicate their buying needs to a sufficient number of suppliers. As such, they often achieve substantial unit cost savings, for example, on commodity services and on perishable items. In the embodiment, even small buying and selling entities 20 may take advantage of the volume based discounts that large organizations have achieved in the past.

Traditional, auctions require the bidder's and seller's physical presence to assemble within an auction house. It would be easier for both buyers and sellers, however, to leave large or numerous inventory stock at its original source and ship purchased items to the successful bidders at the end of the auction. The embodiment saves the sellers 30 time and moving costs by allowing their inventory to remain in their warehouses.

Web sites create volume discounts through predetermined fixed pricing and volume levels with its suppliers. The embodiment, however, may create pooling opportunities in a dynamic and real time environment. In addition, buyers 20 may not need an exact match to the requested item. Each buyer 20 may choose to purchase items that are equal or better than the requested item.

Vendors 30 may be presented with volume sale opportunities that may include different features on similar products. The embodiment creates demand through broadcast notifications to buyers 20 who purchased similar products in the past. The embodiment proactively mines historical bids to invite buyers 20 to join cyclic buying opportunities.

Figure 15:
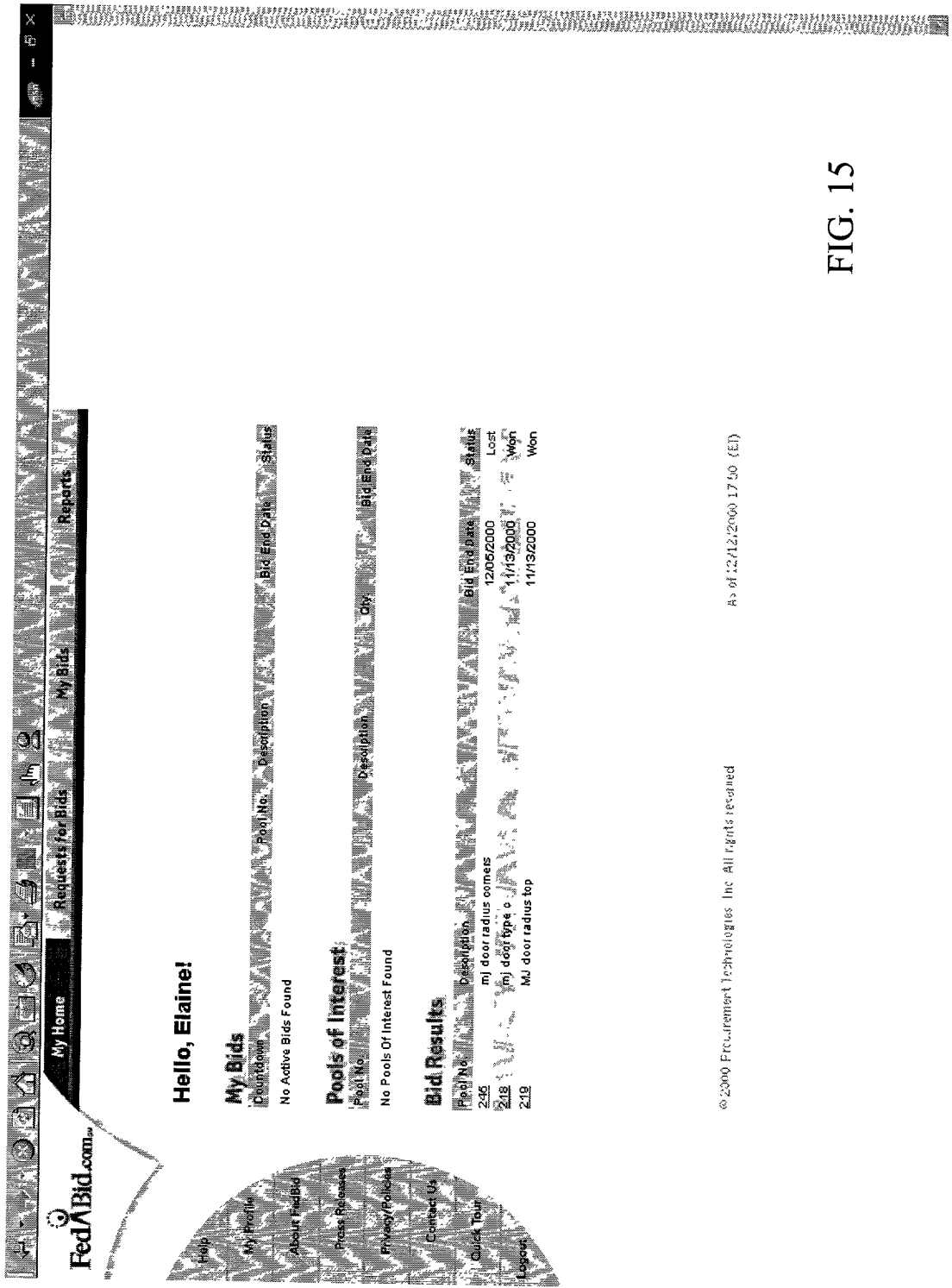
FIG. 15 depicts one implementation of a home page for a vendor.

FIG. 15 depicts one implementation of a home page for the vendor. The page may include current and historical bids. FIG. 16 depicts one implementation of a page illustrating a loosing bid. FIG. 17 depicts one implementation of a page illustrating a winning bid.

Figure 18:
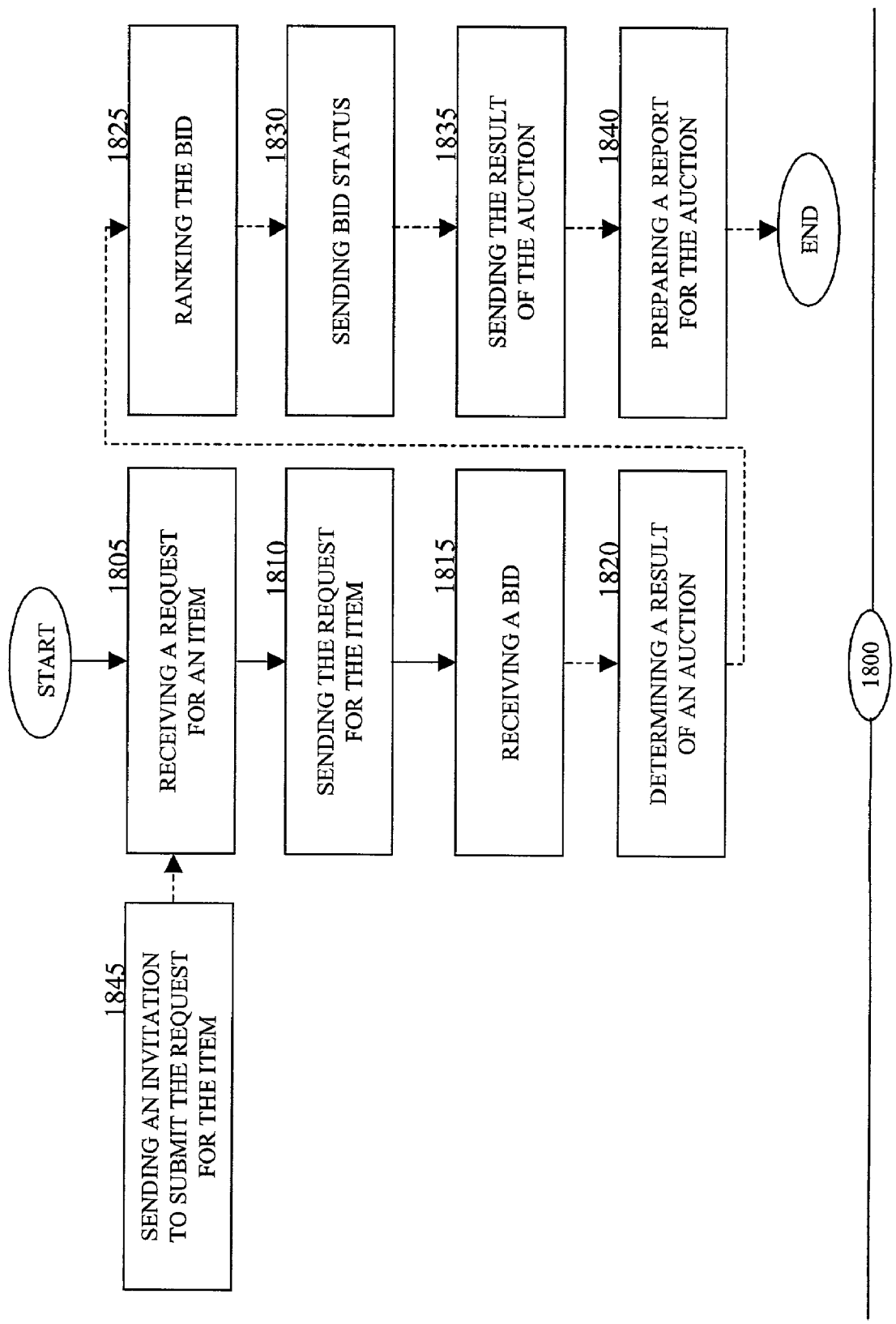
FIG. 18 depicts a flowchart showing one implementation of an auction.

In FIG. 18, a method 1800 provides one implementation of an auction. In block 1805, the method 1800 receives, through a network, a request for an item from a first machine, the request for the item being based on a performance specification of the item. The request for the item from the first computer may also be based on at least one of (i) the item itself and (ii) a term of the request for the item.

In block 1845, the method 1800 may send, through the network, an invitation to the first machine to submit the request for the item, the first machine submitting the request for the item based on the invitation.

In block 1810, the method 1800 sends, through the network, the request for the item to a second machine. The request for the item is sent to the second machine based on (i) the request for the item and (ii) data on at least one potential vendor. The method 1800 may also send, through the network, the request for the item to a third machine.

In block 1815, the method 1800 receives, through the network, a bid from the second machine, the bid being based on the request for the item. The method 1800 may also receive, through the network, a second bid from the third machine, the second bid being based on the request for the item. The request for the item, the first mentioned bid, and the second bid include at least one of (i) performance risk of a potential vendor, (ii) price, (iii) warranty and (iv) performance specification of an item.

In block 1820, the method 1800 determines a result of an auction based on (i) the request for the item, (ii) the first mentioned bid and (iii) a second bid.

In block 1825, the method 1800 ranks the first bid and the second bid based on a comparison between (i) the request for the item and (ii) the first bid and the second bid.

In block 1830, the method 1800 sends at least one of (i) a first status and (ii) a second status to at least one of (i) the second computer and (ii) the third computer. The ranking includes the first status for the first mentioned bid and the second status for the second bid, the status indicating one of (i) a leading bid and (ii) a lagging bid. The method may receive a third bid from at least one of (i) the second computer and (ii) the third computer, the third bid being based on at least one of (i) the first status and (ii) the second status.

In block 1835, the method 1800 sends the result of the auction to at least one of (i) the first machine, (ii) the second machine and (iii) the third machine. An operator of the first machine submits to mediation based on the result of the auction. The operator of the first machine submits a second request for a second item based on the result of the auction.

In block 1840, the method 1800 prepares a report of the auction based on at least one of (i) the request for the item and (ii) a bid. The determination of the result of the auction is based on a match between the request for the item and at least one of (i) the first mentioned bid and (ii) the second bid, the match including at least one of (i) an exact match between the request for the item and at least one of the first mentioned bid and the second bid and (ii) at least one of the first mentioned bid and the second bid satisfying the request for the item.

In the method 1800, the first machine includes a first computer operated by a potential consumer, and the second machine includes a second computer operated by a first potential vendor, and the third machine includes a third computer operated by a second potential vendor.

Figure 19:
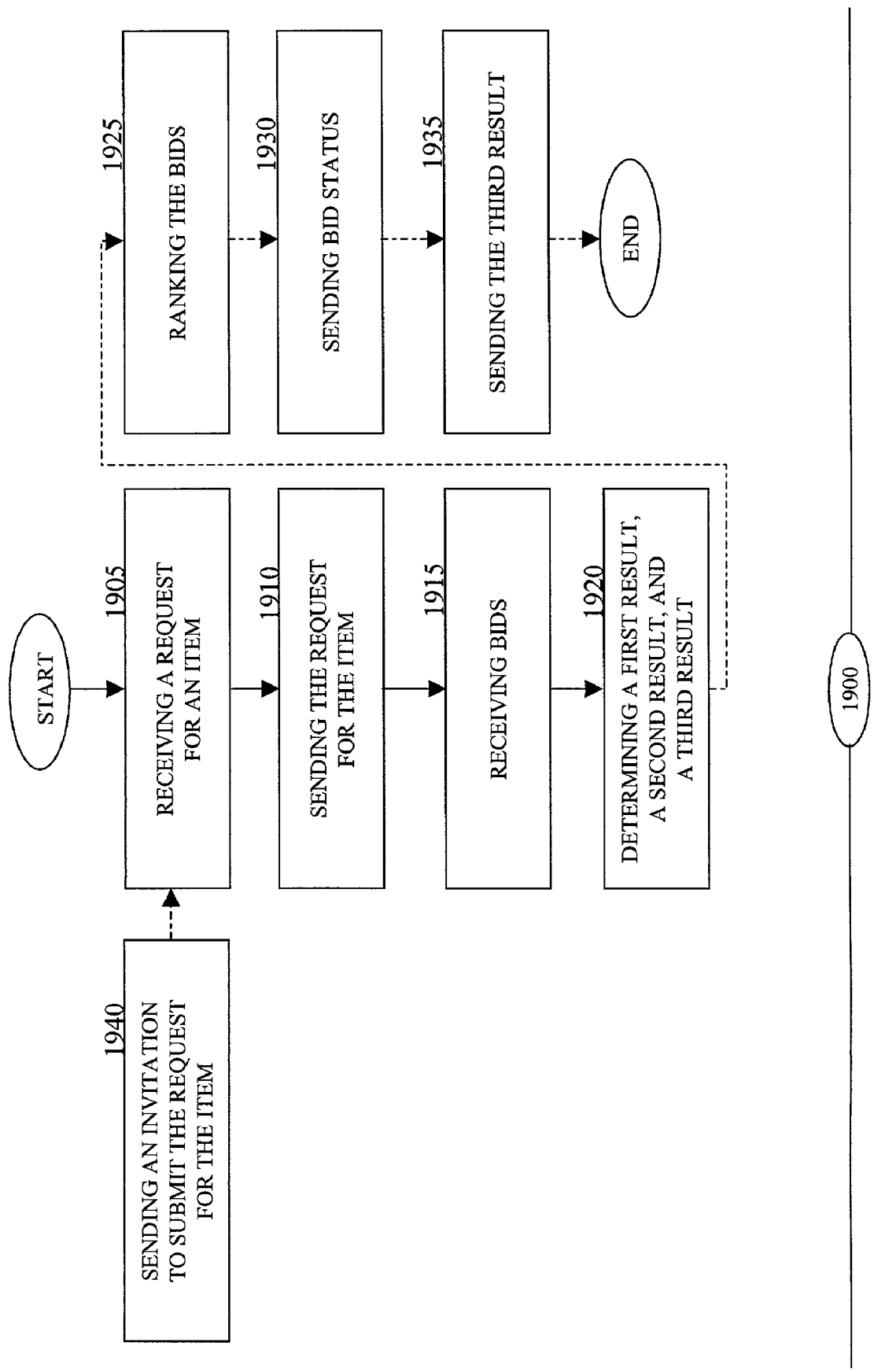
FIG. 19 depicts a flowchart showing one implementation of an auction.

In FIG. 19, a method 1900 provides another implementation of an auction. In block 1905, the method 1900 receives, through a network, a request for an item from a first machine. The request for the item may be based on at least one of (i) a performance specification of the item and (ii) a term of the request for the item.

In block 1940, the method 1900 sends, through the network, an invitation to the first machine to submit the request for the item, the first machine submitting the request for the item based on the invitation.

In block 1910, the method 1900 sends, through the network, the request for the item to a second machine and to a third machine;

In block 1915, the method 1900 receives, through the network, a first bid from the second machine and a second bid from the third machine, the first bid and the second bid being based on the request for the item. The request for the item, the first bid, and the second bid include at least one of (i) performance risk of potential vendor, (ii) price, (iii) warranty and (iv) performance specification of an item.

In block 1920, the method 1900 determines (i) a first result of an auction based on the request for the item and the first bid, (ii) a second result of an auction based on the request for the item and the second bid, and (iii) a third result of an auction based on the first result and the second result. The determination of the third result of the auction may be based on a match between the request for the item and at least one of (i) the first bid and (ii) the second bid, the match including at least one of (i) an exact match between the request for the item and at least one of the first bid and the second bid, and (ii) at least one of the first bid and the second bid satisfying the request for the item.

In block 1925, the method 1900 ranks the first bid and the second bid based on a comparison between (i) the request for the item and (ii) the first bid and the second bid.

In block 1930, the method 1900 sends at least one of (i) a first status and (ii) a second status to at least one of (i) the second machine and (ii) the third machine. The ranking includes the first status for the first bid and the second status for the second bid, the status indicating one of (i) a leading bid and (ii) a lagging bid.

In block 1935, the method 1900 sends the third result of the auction to at least one of (i) the first machine, (ii) the second machine and (iii) the third machine. The request for the item may be sent to the second machine and the third machine based on (i) the request for the item and (ii) data on at least one potential vendor.

In the method 1900, the first machine includes a first computer operated by a potential consumer, the second machine includes a second computer operated by a first potential vendor, and the third machine includes a third computer operated by a second potential vendor. An operator of the first machine may submit to mediation based on the result of the auction. The method 1900 may receive a third bid from at least one of (i) the second computer and (ii) the third computer, the third bid being based on at least one of (i) the first status and (ii) the second status. The operator of the first machine may submit a second request for a second item based on the third result of the auction.

Figure 20:
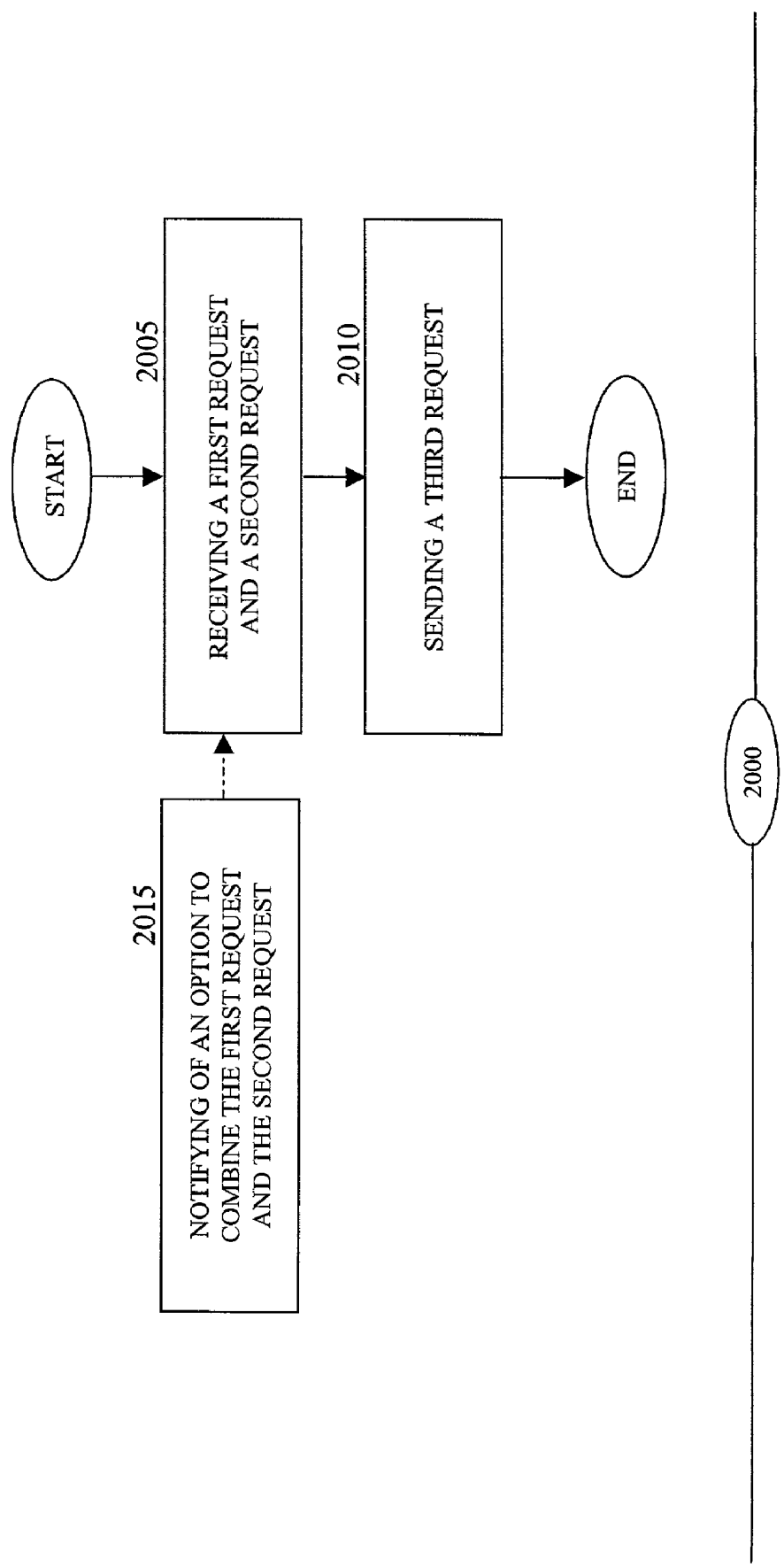
FIG. 20 depicts a flowchart showing one implementation of an auction.

In FIG. 20, a method 2000 provides another implementation of an auction. In block 2005, the method 2000 receives, through a network, a first request for a first item from a first machine, and a second request for a second item from a second machine.

In block 2010, the method 2000 sends, through the network, a third request for a third item to a third machine, the third request for the third item being based on (i) the first request for the first item and (ii) the second request for the second item. The third request for the third item may also be sent to the third machine based on (i) the third request for the third item and (ii) data on at least one potential vendor.

In the method 2000, the first machine includes a first computer operated by a first potential consumer, the second machine includes a second computer operated by a second potential consumer, and the third machine includes a third computer operated by a potential vendor. In block 2015, the method 2000 notifies the first potential consumer and the second potential consumer of an option to combine the first request and the second request.

Figure 21:
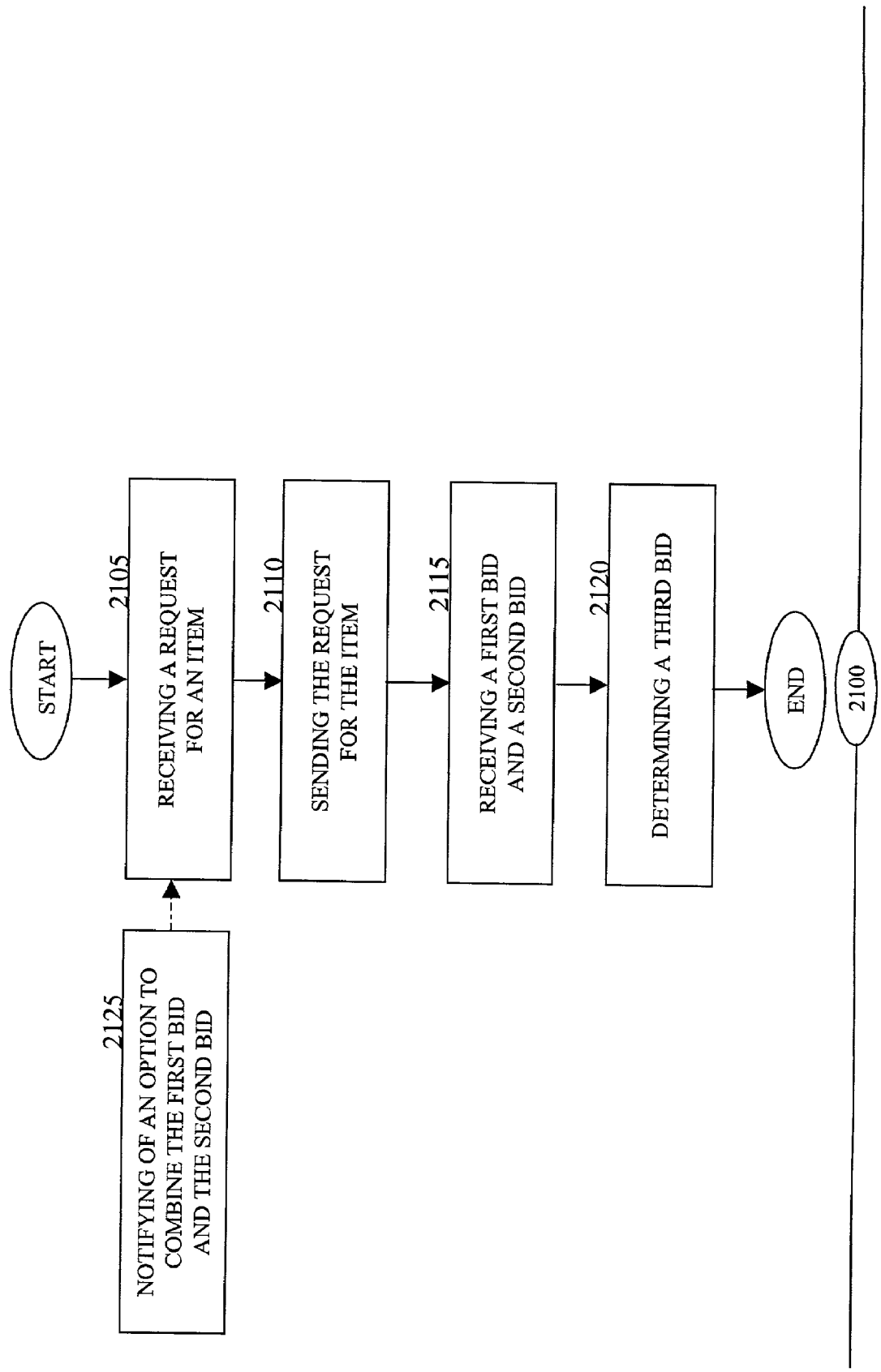
FIG. 21 depicts a flowchart showing one implementation of an auction.

In FIG. 21, a method 2100 provides another implementation of an auction. In block 2105, the method 2100 receives, through a network, a request for an item from a first machine.

In block 2110, the method 2100 sends, through the network, the request for the item to a second machine and to a third machine. The request for the item may be sent to the second machine and the third machine based on (i) the request for the item and (ii) data on at least one potential vendor.

In block 2115, the method 2100 receives, through the network, a first bid from the second machine and a second bid from the third machine, the first bid and the second bid being based on the request for the item.

In block 2120, the method 2100 determines a third bid, the third bid being based on (i) the first bid and (ii) the second bid. The method 2100 may also receive, through the network, the third bid from at least one of (i) the second machine and (ii) the third machine.

In the method 2100, the first machine includes a first computer operated by a potential consumer, the second machine includes a second computer operated by a first potential vendor, and the third machine includes a third computer operated by a second potential vendor. In block 2125, the method 2100 may notify the first potential vendor and the second potential vendor of an option to combine the first bid and the second bid.

Figure 22:
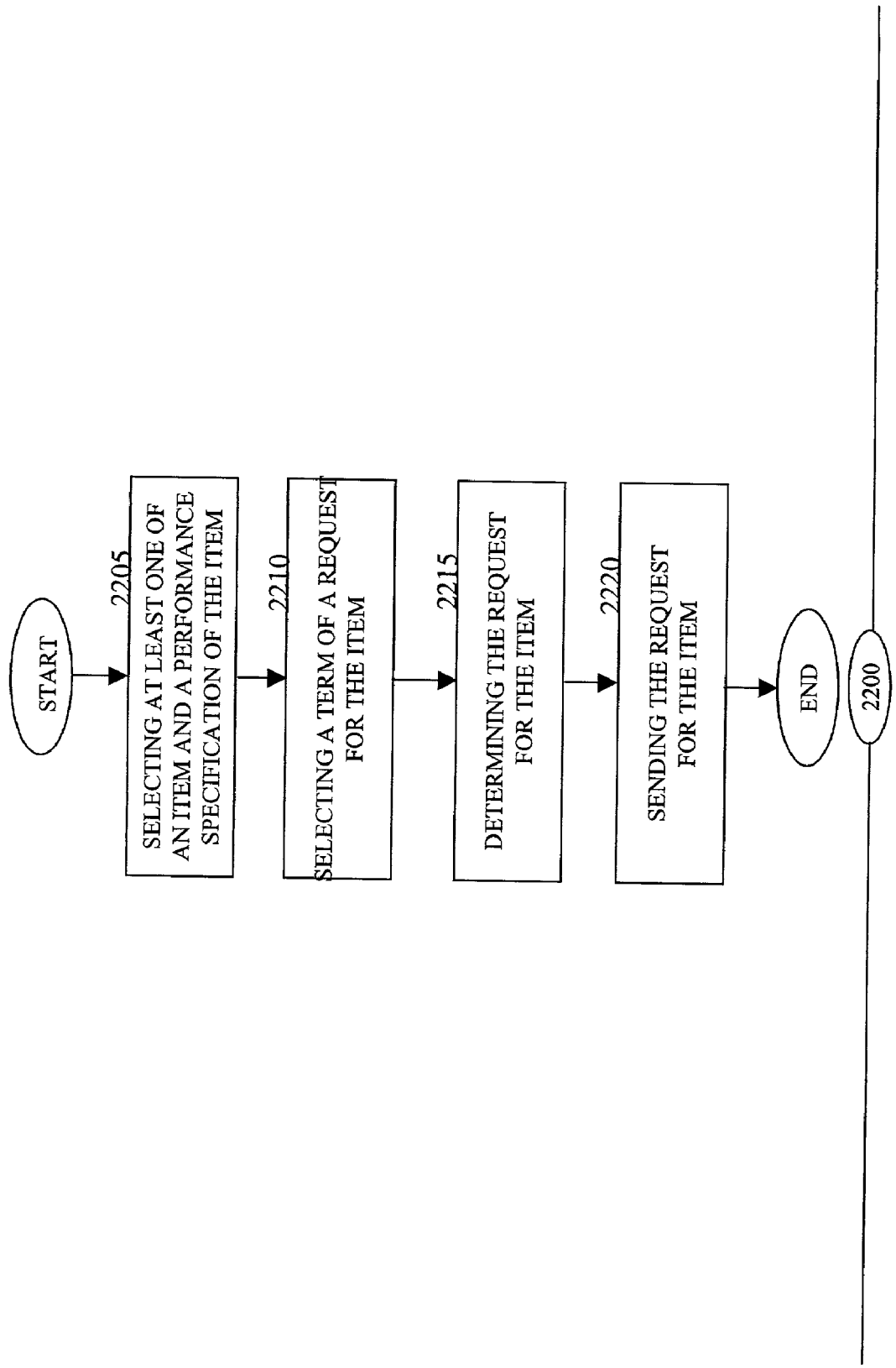
FIG. 22 depicts a flowchart showing one implementation for generating a request for an item.

In FIG. 22, a method 2200 provides one implementation for generating a request for the item. In block 2205, the method 2200 selects at least one of (i) an item to purchase and (ii) a performance specification of the item to purchase. The item may include at least one of (i) a product and (ii) a service.

In block 2210, the method 2200 selects a term of a request for the item to purchase. The term includes at least one of (i) type of vendor, (ii) closing date of auction, (iii) closing time of auction, (iv) evaluation criteria of a bid and (v) award criteria of a bid. The type of vendor includes at least one of (i) socioeconomic classification of vendor and (ii) geographic location of vendor. The evaluation criteria of the bid includes a match between the request for the item and a bid from a potential vendor, the match including at least one of (i) an exact match between the request for the item and the bid from the potential vendor and (ii) the bid from the potential vendor satisfying the request for the item. The award criteria of the bid includes one of (i) best value and (ii) low price. The best value may be based on at least one of (i) performance risk of a potential vendor, (ii) price, (iii) warranty and (iv) performance specification of an item.

The at least one of (i) the item to purchase, (ii) the performance specification of the item to purchase and (iii) the term of the request for the item to purchase may be selected from a database having the at least one of (i) the item to purchase, (ii) the performance specification of the item to purchase and (iii) the term of the request for the item to purchase. The selection of the at least one of (i) the item to purchase, (ii) the performance specification of the item to purchase and (iii) the term of the request for the item to purchase may also be based on at least one of (i) a past auction and (ii) an active auction.

In block 2215, the method 2200 determines the request for the item to purchase based on at least one of (i) the item itself, (ii) the performance specification of the item and (iii) the term of the request for the item. The determination of the request for the item to purchase may be based on at least one of (i) a past request for an item and (ii) an active request for an item.

In block 2220, the method 2200 sends, through a network, the request for the item to an auctioneer machine server.

Figure 23:
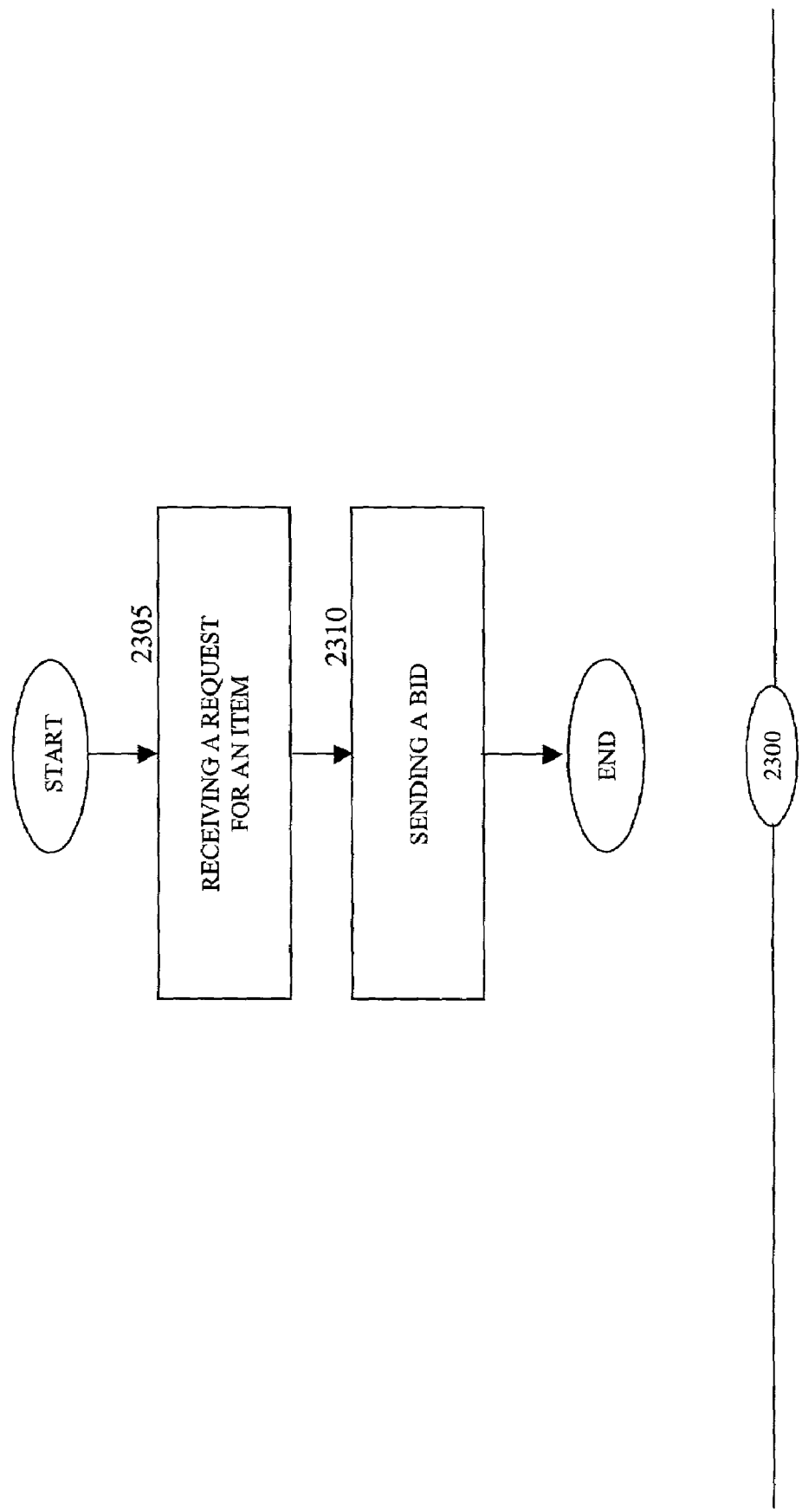
FIG. 23 depicts a flowchart showing one implementation of an auction.

In FIG. 23, a method 2300 provides another implementation for an auction. In block 2305, the method 2300 receives, through a network, a request for an item from a machine, the request for the item being based on a performance specification of the item. The request for the item from the machine may also be based on at least one of (i) the item itself and (ii) a term of the request for the item. The machine includes one of (i) a computer server operated by an auctioneer and (ii) a computer operated by a potential consumer.

In block 2310, the method 2300 sends, through the network, a bid to the machine, the bid being based on the request for the item. The bid matches or satisfies the request for the item.

Figure 24:
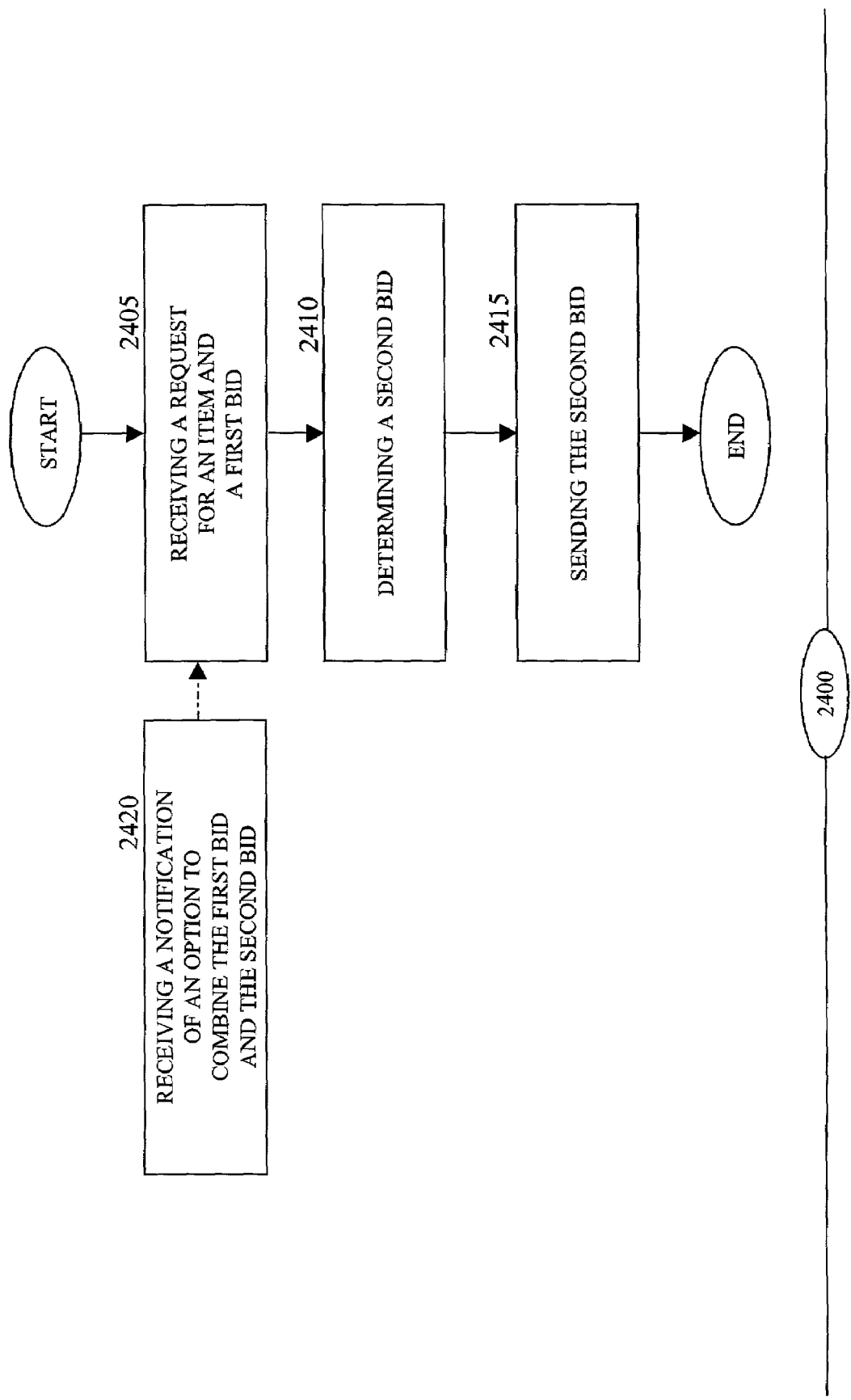
FIG. 24 depicts a flowchart showing one implementation of an auction.

In FIG. 24, a method 2400 provides another implementation for an auction. In block 2405, the method 2400 receives, through a network, (i) a request for an item from a first machine and (ii) a first bid from a second machine, the first bid being based on the request for the item. The first machine includes one of (i) a computer server operated by an auctioneer and (ii) a computer operated by a potential consumer, and the second machine includes a computer operated by a potential vendor.

In block 2410, the method 2400 determines a second bid, the second bid being based on (i) the request for the item and (ii) the first bid.

In block 2415, the method 2400 sends, through the network, the second bid to the first machine.

In block 2420, the method 2400 receives, through the network, a notification of an option to combine the first bid and the second bid.

Figure 25:
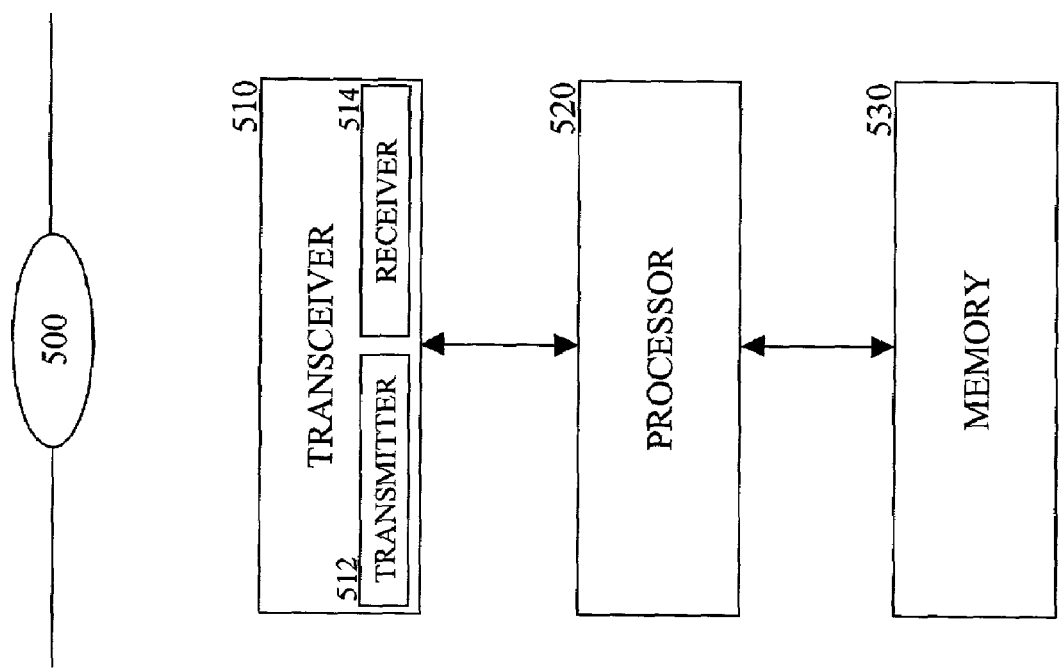
FIG. 25 depicts one embodiment of an apparatus for an auction based procurement system.

FIG. 25 illustrates one implementation of an apparatus 500. The server 10, the computer 20, and the computer 30 (see FIG. 1) comprise the apparatus 500, which comprises a transceiver 510, a processor 520, and memory 530. The transceiver 510 includes a transmitter 512 that allows the apparatus 500 to transmit information, for example, to the network 41 over a communications link. The transceiver 510 also includes a receiver 514 that allows the apparatus 500 to receive information, for example, from the network 41 over the communications link. Such transmission and reception operations over the communications link may be conducted using the same or different data rates, communications protocols, carrier frequencies, and/or modulation schemes. Likewise, the operations and/or circuit configurations of the transmitter 512 and the receiver 514, respectively, may be completely independent of one another or, alternatively, may be partially or fully integrated.

The processor 520, which may comprise one or more microprocessors, microcontrollers, or other arrays of logic elements, controls the operation of the apparatus 500 according to a sequence of commands that may be (A) stored in the memory 530 or in another storage device within or coupled to the apparatus 500, (B) entered by a user through an interface such as a data entry device (i.e., a keypad) (not shown), and/or (C) received from the network 41 over the communications link.

Figure 26:
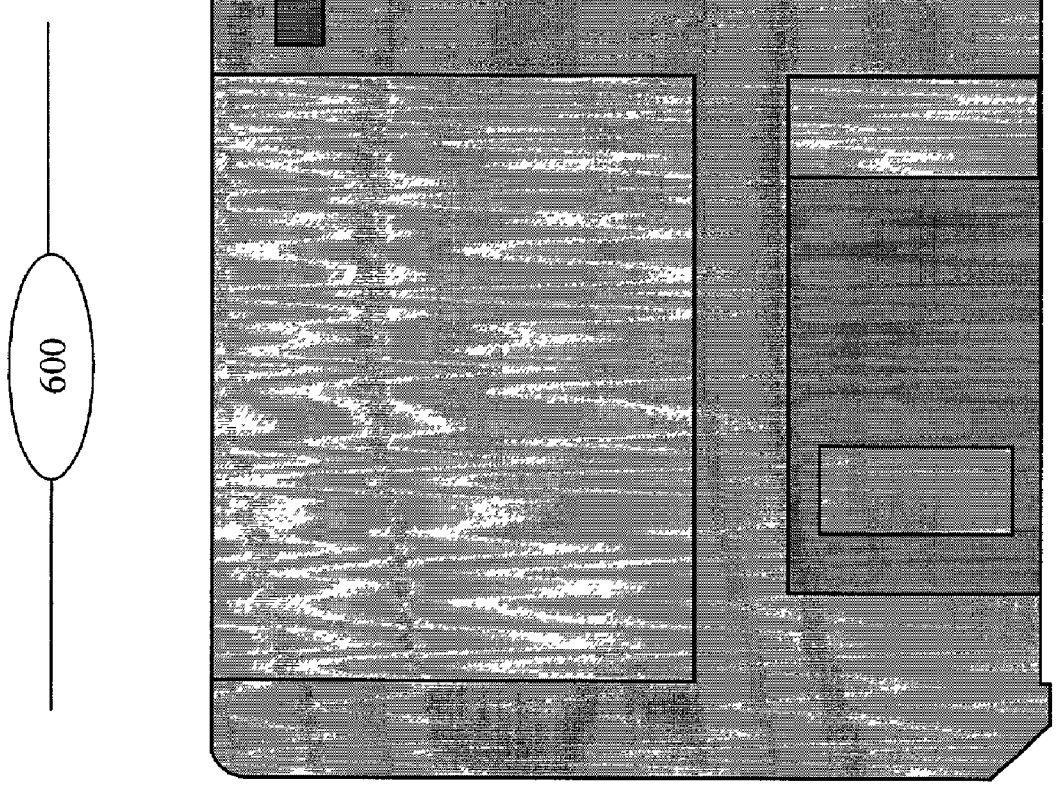
FIG. 26 depicts one embodiment of a machine-readable medium having encoded information, which when read and executed by a machine causes a method for an auction.

The memory 530, which may comprise read-only memory (ROM), random-access memory (RAM), nonvolatile memory, an optical disk, a magnetic tape, and/or a magnetic disk, stores programmable parameters and may also store information including executable instructions, non-programmable parameters, and/or other data. Executable instructions defining a method associated with the presented embodiments may also be stored in the memory 530 for execution by the processor 520. The method may be programmed when the apparatus 500 is manufactured or via a machine-readable medium 600 (e.g., see FIG. 26) at a later date. Such a medium may include any of the forms listed above with respect to the memory 530 and may further include, for example, a carrier wave modulated, or otherwise manipulated, to convey instructions that can be read, demodulated/decoded and executed by the apparatus 500.

In view of the foregoing, it will be apparent to one of ordinary skill in the art that the described embodiments may be implemented in software, firmware, and hardware. The actual software code or specialized control hardware used to implement the present invention is not limiting of the invention. Thus, the operation and behavior of the embodiments is described without specific reference to the actual software code or specialized hardware components. The absence of such specific references is feasible because it is clearly understood that artisans of ordinary skill would be able to design software and control hardware to implement the embodiments of the present invention based on the description herein.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile memory or a software program loaded from or into a data storage medium as machine-readable code, such code being instructions executable by an array of logic elements such as a microprocessor or other digital signal processing unit, or some other programmable machine or system. As such, the present invention is not intended to be limited to the embodiments shown above, any particular sequence of instructions, and/or any particular configuration of hardware but rather is to be accorded the widest scope consistent with the principles and novel features disclosed in any fashion herein.

What is claimed is:

1. A method for an auction, comprising:
   receiving, through a network, a request for an item from a first machines;
   sending, through the network, the request for the item to a second machine;
   receiving, through the network, a first bid from a sender at the second machine, the first bid being based on the request for the item;
   sending, through the network, the request for the item to a third machine;
   receiving, through the network, a second bid from a sender at the third machine, the second bid being based on the request for the item;
   ranking the first bid and the second bid based on a comparison of each bid with the request for the item, the ranking including a first status indicator for the first bid and a second status indicator for the second bid, each of the first and second status indicators indicating one of a leading bid and a lagging bid;
   automatically initiating a re-bid for each lagging bid, the re-bid initiation including comparing each leading bid with a pre-set limit for the sender of the lagging bid; and
   determining a result of the auction based on the request for the item, the first bid and the second bid;
   wherein the result of the auction is based on a match between the request for the item and at least one of (i) the first bid and (ii) the second bid, the match including at least one of (i) an exact match between the request for the item and at least one of the first bid and the second bid and (ii) at least one of the first bid and the second bid satisfying the request for the item.

2. The method of claim 1, wherein the first machine includes a first computer operated by a potential consumer, the second machine includes a second computer operated by a first potential vendor, and the third machine includes a third computer operated by a second potential vendor.

3. The method of claim 2, wherein the request for the item, the first bid, and the second bid include at least one of (i) performance risk of a potential vendor, (ii) price, (iii) warranty and (iv) performance specification of an item.

4. The method of claim 1, further comprising sending the result of the auction to at least one of (i) the first machine, (ii) the second machine and (iii) the third machine.

5. The method of claim 4, wherein sender at the first machine submits a second request for a second item based on the result of the auction.

6. The method of claim 5, wherein the second item and the first item are the same.

7. The method of claim 1, wherein the request for the item is sent to the second machine based on (i) the request for the item and (ii) data on at least one potential vendor.

8. The method of claim 1, further comprising sending, through the network, an invitation to the first machine to submit the request for the item, the first machine submitting the request for the item based on the invitation.

9. A method for an auction, comprising:
   receiving, through a network, a request for an item from a first machine;
   sending, through the network, the request for the item to a second machine and to a third machine;
   receiving, through the network, a first bid from a sender at the second machine and a second bid from a sender at the third machine, the first bid and the second bid being based on the request for the item;
   ranking the first bid and the second bid based on a comparison of each bid with the request for the item, the ranking including a first status indicator for the first bid and a second status indicator for the second bid, each of the first and second status indicators indicating one of a leading bid and a lagging bid;
   automatically initiating a re-bid for each lagging bid, the re-bid initiation including comparing each leading bid with a pre-set limit for the sender of the lagging bid; and
   determining (i) a first result of said auction based on the request for the item and the first bid, (ii) a second result of an auction based on the request for the item and the second bid, and (iii) a third result of an auction based on the first result and the second result.

10. The method of claim 9, wherein the first machine includes a first computer operated by a potential consumer, the second machine includes a second computer operated by a first potential vendor, and the third machine includes a third computer operated by a second potential vendor.

11. The method of claim 10, wherein the request for the item from the potential consumer is based on at least one of (i) a performance specification of the item and (ii) a term of the request for the item.

12. The method of claim 10, wherein the determination of the third result of the auction is based on a match between the request for the item and at least one of (i) the first bid and (ii) the second bid, the match including at least one of (i) an exact match between the request for the item and at least one of the first bid and the second bid, and (ii) at least one of the first bid and the second bid satisfying the request for the item.

13. The method of claim 10, wherein the request for the item, the first bid, and the second bid include at least one of (i) performance risk of potential vendor, (ii) price, (iii) warranty and (iv) performance specification of an item.

14. The method of claim 9, further comprising receiving a third bid from at least one of (i) the second computer and (ii) the third computer, the third bid being based on at least one of (i) the first status indicator and (ii) the second status indicator.

15. The method of claim 9, wherein the request for the item is sent to the second machine and the third machine based on (i) the request for the item and (ii) data on at least one potential vendor.

16. The method of claim 9, further comprising sending, through the network, an invitation to the first machine to submit the request for the item, the first machine submitting the request for the item based on the invitation.

17. The method of claim 9, further comprising sending the third result of the auction to at least one of (i) the first machine, (ii) the second machine and (iii) the third machine.

18. The method of claim 17, wherein an operator of the first machine submits to mediation based on the result of the auction.

19. The method of claim 17, wherein an operator of the first machine submits a second request for a second item based on the third result of the auction.

20. The method of claim 19, wherein the second item and the first item are the same.

21. An apparatus for an auction, comprising:
a receiver to receive a request for an item from a first machine, a first bid from a sender at a second machine and a second bid from a sender at a third machine;
a transmitter to send the request for the item to the second machine and to the third machine; and
a processor coupled to the receiver and the transmitter, the processor being configured to:
rank the first bid and the second bid based on a comparison of each bid with the request for the item, the ranking including a first status indicator for the first bid and a second status indicator for the second bid, each of the first and second status indicators indicating one of a leading bid and a lagging bid;
automatically initiate a re-bid for each lagging bid, the re-bid initiation including comparing each leading bid with a pre-set limit for the sender of the lagging bid; and
determine (i) a first result of an auction based on the request for the item and the first bid, (ii) a second result of an auction based on the request for the item and the second bid, and (iii) a third result of an auction based on the first result and the second result, wherein the first bid and the second bid are based on the request for the item.

22. The apparatus of claim 21, wherein the first machine includes a first computer operated by a potential consumer, the second machine includes a second computer operated by a first potential vendor, and the third machine includes a third computer operated by a second potential vendor.

23. The apparatus of claim 22, wherein the request for the item from the potential consumer is based on at least one of (i) a performance specification of the item and (ii) a term of the request for the item.

24. The apparatus of claim 22, wherein the determination of the third result of the auction is based on a match between the request for the item and at least one of (i) the first bid and (ii) the second bid, the match including at least one of (i) an exact match between the request for the item and at least one of the first bid and the second bid, and (ii) at least one of the first bid and the second bid satisfying the request for the item.

25. The apparatus of claim 22, wherein the request for the item, the first bid, and the second bid include at least one of (i) performance risk of potential vendor, (ii) price, (iii) warranty and (iv) performance specification of an item.

26. The apparatus of claim 21, wherein the request for the item is sent to the second machine and the third machine based on (i) the request for the item and (ii) data on at least one potential vendor.

27. A machine-readable medium having encoded information, which when read and executed by a machine causes a method comprising:
receiving, through a network, a request for an item from a first machine;
sending, through the network, the request for the item to a second machine and to a third machine;
receiving, through the network for an auction, a first bid from a sender at the second machine and a second bid from a sender at the third machine, the first bid and the second bid being based on the request for the item;
ranking the first bid and the second bid based on a comparison of each bid with the request for the item, the ranking including a first status indicator for the first bid and a second status indicator for the second bid, each of the first and second status indicators indicating one of a leading bid and a lagging bid;
automatically initiating a re-bid for each lagging bid, the re-bid initiation including comparing each leading bid with a pre-set limit for the sender of the lagging bid; and
determining (i) a first result of said auction based on the request for the item and the first bid, (ii) a second result of said auction based on the request for the item and the second bid, and (iii) a third result of said auction based on the first result and the second result.

28. The machine-readable medium of claim 27, wherein the first machine includes a first computer operated by a potential consumer, the second machine includes a second computer operated by a first potential vendor, and the third machine includes a third computer operated by a second potential vendor.

29. The machine-readable medium of claim 28, wherein the request for the item from the potential consumer is based on at least one of (i) a performance specification of the item and (ii) a term of the request for the item.

30. The machine-readable medium of claim 28, wherein the determination of the third result of the auction is based on a match between the request for the item and at least one of (i) the first bid and (ii) the second bid, the match including at least one of (i) an exact match between the request for the item and at least one of the first bid and the second bid, and (ii) at least one of the first bid and the second bid satisfying the request for the item.

31. The machine-readable medium of claim 28, wherein the request for the item, the first bid, and the second bid include at least one of (i) performance risk of potential vendor, (ii) price, (iii) warranty and (iv) performance specification of an item.

32. The machine-readable medium of claim 27, wherein the request for the item is sent to the second machine and the third machine based on (i) the request for the item and (ii) data on at least one potential vendor.

33. A method for performing an on-line auction, the method comprising:
receiving, via a network, a bid request for an item;
receiving, via the network, at least two responses to the bid request, each response having a sender;
ranking each of the responses via a rank indicator, each rank indicator indicating one of a leading and a lagging bid;
notifying, via the network, each response sender of the rank indicator of the response; and
automatically initiating a re-bid for each lagging response, the re-bid initiation including comparing each leading response with a pre-set limit for the sender of the lagging response.

34. The method of claim 33, wherein the re-bid initiation further comprises:
decreasing the lagging response by an increment amount; and comparing the decreased lagging response with the leading response upon each incremental decrease.

35. The method of claim 33, wherein the leading response is a target price set by the requestor of the bid.

36. The method of claim 35, wherein the re-bid initiation further includes decreasing the lagging response by an increment amount, and comparing the decreased lagging response with the target price upon each incremental decrease.

37. The method of claim 33, wherein the bid request is based on a performance characteristic of the item.

38. The method of claim 33, wherein the bid request is based on a price of the item.

39. The method of claim 33, wherein the bid request is based on an identification of the item.

40. A method for performing an on-line auction, the method comprising:
   receiving, via a network, a bid request for an item;
   receiving, via the network, at least two responses to the bid request, each response having a sender;
   ranking each of the responses via a rank indicator, each rank indicator indicating one of a leading bid, a lagging bid, and a no-bid;
   notifying, via the network, each response sender of the rank indicator of the response; and
   automatically initiating a re-bid for each lagging response, the re-bid initiation including comparing each leading response with a pre-set limit for the sender of the lagging response.

41. The method of claim 40, wherein the re-bid initiation further comprises:
   decreasing the lagging response by an increment amount; and
   comparing the decreased lagging response with the leading response upon each incremental decrease.

42. A system for an on-line auction, comprising:
   receiving means for receiving, via a network, a bid request for an item;
   receiving means for receiving, via the network, at least two responses to the bid request, each response having a sender;
   ranking means for ranking each of the responses via a rank indicator, each rank indicator indicating one of a leading and a lagging bid;
   notifying means for notifying, via the network, each response sender of the rank indicator of the response; and
   initiating means for automatically initiating a re-bid for each lagging response, the initiating means including comparison means for comparing each leading response with a pre-set limit for the sender of the lagging response.

43. The system of claim 42, wherein the initiating means comprises:
   decreasing means for decreasing the lagging response by an increment amount; and
   second comparison means for comparing the decreased lagging response with the leading response upon each incremental decrease.

44. The system of claim 42, wherein the leading response is a target price set by the requester of the bid.

45. The system of claim 44, wherein the initiating means comprises:
   decreasing means for decreasing the lagging response by an increment amount; and
   second comparison means for comparing the decreased lagging response with the leading response upon each incremental decrease.

46. The system of claim 42, wherein the bid request is based on an identification of the item.

47. A system for an on-line auction, comprising:
   receiving means for receiving, via a network, a bid request for an item;
   receiving means for receiving, via the network, at least two responses to the bid request, each response having a sender;
   ranking means for ranking each of the responses via a rank indicator, each rank indicator indicating one of a leading bid, a lagging bid, and a no-bid;
   notifying means for notifying, via the network, each response sender of the rank indicator of the response; and
   initiating means for initiating a re-bid for each lagging response, the initiating means including comparison means for comparing each leading response with a pre-set limit for the sender of the lagging response.

48. The system of claim 47, wherein the initiating means comprises:
   decreasing means for decreasing the lagging response by an increment amount; and
   second comparison means for comparing the decreased lagging response with the leading response upon each incremental decrease.

49. A computer program product comprising a computer usable medium having control logic stored therein for causing a computer to provide interactive assistance with performing an on-line auction, the control logic comprising:
   first computer readable program code means for receiving, via a network, a bid request for an item;
   second computer readable program code means for receiving, via the network, at least two responses to the bid request, each response having a sender;
   third computer readable program code means for ranking each of the responses via a rank indicator, each rank indicator indicating one of a leading and a lagging bid;
   fourth computer readable program code means for notifying, via the network, each response sender of the rank indicator of the response; and
   fifth computer readable program code means for automatically initiating a re-bid for each lagging response, the initiating means including comparison means for comparing each leading response with a pre-set limit for the sender of the lagging response.

50. The computer program product of claim 49, wherein the fifth computer readable program code means further comprises:
   sixth computer readable program code means for decreasing the lagging response by an increment amount; and
   seventh computer readable program code means for comparing the decreased lagging response with the leading response upon each incremental decrease.

51. The computer program product of claim 49, wherein the leading response is a target price set by the requestor of the bid.

52. The computer program product of claim 51, wherein the fifth computer readable program code means further comprises:
   sixth computer readable program code means for decreasing the lagging response by an increment amount; and
   seventh computer readable program code means for comparing the decreased lagging response with the target price upon each incremental decrease.

53. A computer program product comprising a computer usable medium having control logic stored therein for causing a computer to provide interactive assistance with performing an on-line auction, the control logic comprising:
- first computer readable program code means for receiving, via a network, a bid request for an item;
- second computer readable program code means for receiving, via the network, at least two responses to the bid request, each response having a sender;
- third computer readable program code means for ranking each of the responses via a rank indicator, each rank indicator indicating one of a leading bid, a lagging bid, and a no-bid;
- fourth computer readable program code means for notifying, via the network, each response sender of the rank indicator of the response; and
- fifth computer readable program code means for automatically initiating a re-bid for each lagging response, the initiating means including comparison means for comparing each leading response with a pre-set limit for the sender of the lagging response.

54. The computer program product of claim 53, wherein the fifth computer readable program code means further comprises:
- sixth computer readable program code means for decreasing the lagging response by an increment amount; and
- seventh computer readable program code means for comparing the decreased lagging response with the leading response upon each incremental decrease.

* * * * *